(12) United States Patent
Blanc et al.

(10) Patent No.: US 9,861,227 B2
(45) Date of Patent: Jan. 9, 2018

(54) INFUSION UNIT FOR A MACHINE FOR MAKING BEVERAGES

(75) Inventors: Jean-Pierre Blanc, Nice (FR); Alain Goering, Nice (FR)

(73) Assignee: Compagnie Mediterraneene Des Cafes, Carros (FR)

( * ) Notice: Subject to any disclaimer, the term of this patent is extended or adjusted under 35 U.S.C. 154(b) by 1212 days.

(21) Appl. No.: 13/699,538

(22) PCT Filed: May 23, 2011

(86) PCT No.: PCT/EP2011/058389
§ 371 (c)(1),
(2), (4) Date: Feb. 5, 2013

(87) PCT Pub. No.: WO2011/147791
PCT Pub. Date: Dec. 1, 2011

(65) Prior Publication Data
US 2013/0133525 A1    May 30, 2013

(30) Foreign Application Priority Data

May 25, 2010 (FR) ...................................... 10 54006

(51) Int. Cl.
*A47J 31/44*    (2006.01)
*A47J 31/36*    (2006.01)

(52) U.S. Cl.
CPC ......... *A47J 31/446* (2013.01); *A47J 31/3633* (2013.01); *Y10T 29/49826* (2015.01)

(58) Field of Classification Search
CPC ............................ A47J 31/3633; A47J 31/446
See application file for complete search history.

(56) References Cited

U.S. PATENT DOCUMENTS 3,774,523 A * 11/1973 Moot ........................... 99/323.8
5,144,886 A    9/1992 Göeckelmann et al.
(Continued)

FOREIGN PATENT DOCUMENTS

JP          2295522       12/1990
WO       2008142040       11/2008
WO    WO 2009113035 A2 *  9/2009

OTHER PUBLICATIONS

International Search Report from the European Patent Office dated Jul. 5, 2011, for International Patent Application No. PCT/EP2011/058389, Filed May 23, 2011, Applicant, Compagnie Mediterraneenne Des Cafes. (2 pages).

(Continued)

*Primary Examiner* — David Angwin
*Assistant Examiner* — John J Norton
(74) *Attorney, Agent, or Firm* — McCracken & Gillen LLC

(57) ABSTRACT

The present invention relates to an infusion unit forming a hollow inner space that receives inserted elements, characterized in that it consists of a reinforcement belt that defines the hollow inner space of the infusion unit, said belt including means for taking up the forces generated while infusing on at least one inserted element, the reinforcement belt further including receiving means for each of said elements. The invention also relates to a machine container as well as to a machine with one such infusion unit, and similarly to a method for assembling at least one element to be inserted into an infusion unit. The invention can be used in all types of infusion machines, in particular EXPRESSO coffee machines.

21 Claims, 16 Drawing Sheets

(56) References Cited

U.S. PATENT DOCUMENTS

| | | | | |
|---|---|---|---|---|
| 5,916,351 | A * | 6/1999 | Sintchak | 99/284 |
| 6,510,783 | B1 * | 1/2003 | Basile et al. | 99/289 R |
| 7,707,927 | B2 * | 5/2010 | Boussemart et al. | 99/280 |
| 2003/0121917 | A1 * | 7/2003 | Fore et al. | 220/4.22 |
| 2007/0000944 | A1 * | 1/2007 | Cahen et al. | 222/108 |
| 2010/0159108 | A1 * | 6/2010 | Blanc et al. | 426/590 |
| 2011/0041696 | A1 * | 2/2011 | Aemisegger et al. | 99/281 |
| 2011/0265657 | A1 * | 11/2011 | Icardi | 99/280 |

OTHER PUBLICATIONS

European Patent Office Written Opinion for International Patent Application No. PCT/EP2011/058389, Filed May 23, 2011, Applicant, Compagnie Mediterraneenne Des Cafes. (4 pages).

English translation of European Patent Office Written Opinion for International Patent Application No. PCT/EP2011/058389, Filed May 23, 2011, Applicant, Compagnie Mediterraneenne Des Cafes (5 pages).

* cited by examiner

INFUSION UNIT FOR A MACHINE FOR MAKING BEVERAGES

CROSS-REFERENCE TO RELATED APPLICATIONS

Not applicable.

STATEMENT REGARDING FEDERALLY SPONSORED RESEARCH OR DEVELOPMENT

Not applicable.

SEQUENCE LISTING

Not applicable.

TECHNICAL FIELD

The present invention relates to an infusion unit with a reinforcement belt for a machine for making beverages by means of the extraction of a product to be infused, said belt including receiving means for at least one element to be inserted into the unit, said unit being rigidly connected to a preferably removable component part of the machine.

More specifically, the invention is suitable for use in the field of EXPRESSO-type coffee machines. It may also be used for making beverages using other materials such as tea. It will be particularly suitable for use in the field of machines for making beverages by means of the infusion of a product contained in a dose.

BACKGROUND

In a known manner, said machines include an infusion unit providing the extraction of a product such as coffee. An infusion unit usually comprises an extraction chamber that is sealed during the extraction phase and capable of being opened to receive or release the product that is being used for the infusion. The outlet of the chamber leads into a container such as a cup.

One of the most common infusion systems uses an extraction chamber produced in two portions, one being fixed and the other rendered mobile. One of the two half-chambers comprises the pressurised hot water inlet whereas the other has a spout through which is distributed the infused coffee from the dose contained in the extraction chamber. The infusion pressure being provided by a pump embedded in the machine, it is possible to use the hydraulic pressure of said same pump to provide the movement of the mobile half-chamber by associating thereto a hydraulic cylinder in order to provide the automatic closing thereof limiting the human effort. Such a machine is known for example from document WO-A-20081142040.

In numerous machines, the unit is fixed onto the frame of the machine in a non-removable manner. The dismounting thereof is therefore rendered very difficult or even impossible. This is particularly disadvantageous for the cleaning thereof, the maintenance thereof or the end-of-life recycling thereof, by not meeting the eco-design requirements which impose the dismantling and the recycling of component parts of such machines.

Moreover and especially, as expresso coffee is produced by infusing a predetermined amount of roasted and ground coffee with hot water at very high pressure through a previously sealed extraction chamber, the higher the infusion pressure the greater the closing force of the two half-chambers must be significant to provide the sealing during the infusion.

The significant force applied to the fixed half-chamber and resulting from the pressure of the driving means of the mobile half-chamber causes in reaction a force just as significant but in the opposite direction on said driving means. Said two opposite forces must imperatively be withstood by a correctly dimensioned mechanical element to prevent the destruction at least partial of the machine.

Given the significant pressure involved in domestic expresso machines, up to 20 bars, the mechanical element clasping the driving means for the mobile chamber, said driving means frequently being in the form of a cylinder, as well as the two infusion half-chambers, and withstanding the resulting forces is currently produced from the complex assembly of a plurality of large section metal elements, generally made of steel. Said various elements are subject to corrosion, being more voluminous and heavy which results in a significant minimum volume for the entire machine, to the detriment of the economic cost thereof as well as the environmental impact thereof for both the use of natural resources and the amount of energy required for the manufacturing thereof and distribution thereof.

Thus, there is a need to design a pressure-resistant infusion unit whilst being less voluminous and less heavy than the units proposed in prior art.

There is also a second need to design an installation of at least one element to be inserted into the unit that is easy to achieve, said element may be, for example, the fixed and/or mobile half-chamber or chambers as well as the driving means of the mobile half-chamber and also auxiliary devices for guiding the dose or sequential closing and/or opening of the half-chambers.

The present invention aims to meet at least one of said needs.

SUMMARY

For this purpose, an embodiment of the invention relates to an infusion unit for a machine for making beverages by means of the extraction of a product to be infused in the form of a dose, said unit forming a hollow inner space that receives inserted elements including at least one mobile half-chamber and another half-chamber opposite, said two half-chambers in a position applied one against the other forming the extraction chamber, as well as driving means, also called driving device, for driving the mobile half-chamber between a position applied against said other half-chamber and a position at a distance from said other half-chamber, characterised in that it consists of a reinforcement belt defining the hollow inner space of the infusion unit, said belt including means for, also called structure for, taking up the forces generated while infusing on at least one inserted element, the reinforcement belt further including receiving means, also called receiving member, for each of said elements.

The technical effect obtained is firstly to perform holding of at least one inserted element into an infusion unit which is effective and which prevents possible damage to said element and even to other parts of the machine in operation in the unit and then to enable the element to be rapidly inserted into the unit, with means specifically suitable for the features of the element. This further procures a maintenance facility as well as a possibility of end-of-life dismantling of the machine supporting said unit at a reasonable cost.

It is thus optionally possible to replace voluminous metal elements for the maintenance and the reinforcement with at least one unitary and compact component, preferably made from plastic, produced for example by injection and correctly dimensioned to withstand the forces generated while infusing.

The machine according to the invention also has the advantage of having a facility for dismounting the component part thereof supporting the infusion unit in the aim of the cleaning thereof, the maintenance thereof and/or for the end-of-life dismantling thereof.

The invention also relates to a machine for making beverages by means of the extraction of a product to be infused, including such a unit or such a container.

Finally, the invention relates to a method for assembling at least one element in an infusion unit, characterised in that it includes the step for mounting the element inside a reinforcement belt flanking the inner space of the unit, such that the force exerted on said element is transmitted to the belt therefore taking up the forces exerted on the element.

The aim of the invention is also a machine for preparing beverages including means for receiving an extraction or infusion unit and a hydraulic circuit comprising a pump, the hydraulic circuit being intended to be fluidly connected to the unit. The machine is arranged such that the rigid connection of the unit to the receiving means causes the fluidic connection of the unit to the hydraulic circuit. Thus, the mounting of the unit onto the machine is obtained in a particularly simple manner. The invention simplifies the existing mountings which require at least one step for rigidly connecting the unit and fluidic connection steps between the circuit including the pump and the unit.

Particularly advantageously, the receiving means of the unit are configured to enable a removable disconnection of the unit, and the machine is arranged such that the disconnection of the unit from the receiving means eliminates the fluidic connection between the unit and the hydraulic circuit.

Thus, the invention enables the unit to be very easily dismounted in view of the cleaning thereof, the maintenance thereof or the dismantling thereof for example.

Preferably, the circuit includes at least one fluidic connector and the unit includes at least one complementary fluidic connector. The machine is configured such that the insertion of the unit onto the machine results in the engagement of the at least one fluidic connector with the at least one complementary fluidic connector. Said engagement provides the fluidic connection between the hydraulic circuit and the unit. Preferably, said engagement is obtained by fitting the at least one fluidic connector with the at least one complementary fluidic connector. Preferably, said engagement is obtained by a relative translational motion between the unit and the hydraulic circuit.

Said features may be used independently of the features relating to the belt for taking up the forces.

Advantageously and optionally, the method for assembling at least one element to be inserted into such an infusion unit includes the following steps:
the driving means of the mobile half-chamber are inserted into the inner space of the infusion unit, where applicable with the mobile half-chamber when said half-chamber is grouped with the driving means, this in a position in the inner space other than the final position thereof,
the driving means are slid inside said unit in the final position thereof resting against a face of the unit and the driving means are rigidly connected to the unit,
the mobile half-chamber is inserted into the inner space of the infusion unit, when said mobile half-chamber has not already been inserted with the driving means,
the other half-chamber, resting on the face opposite the support face of the driving means, is inserted into the inner space of the infusion unit, the rigid connection with said face being carried out via the rear of said other half-chamber.

Advantageously, the method also includes the following optional steps:
in the inner gap of the unit remaining between said other half-chamber, on one hand, and the mobile chamber, on the other hand, is inserted a fixed assembly supporting, with sliding freedom in relation to said fixed assembly, a closing device upstream and downstream of the half-chambers, the lateral portions of said fixed assembly being rigidly connected to the portions facing the unit,
the locking means of the unit are inserted in relation to a component part of the machine receiving said unit on an outer portion of a lateral side of the unit, this by sliding of the locking means lengthwise of the side,
the actuation means are stacked on the locking means such that a vertical movement of the actuation means results in a horizontal sliding of the locking means.

BRIEF DESCRIPTION OF THE DRAWINGS

Other features, aims and advantages of the present invention will appear upon reading the following detailed description and referring to the appended drawings given as non-limiting examples and wherein.

DETAILED DESCRIPTION

Figure 1:
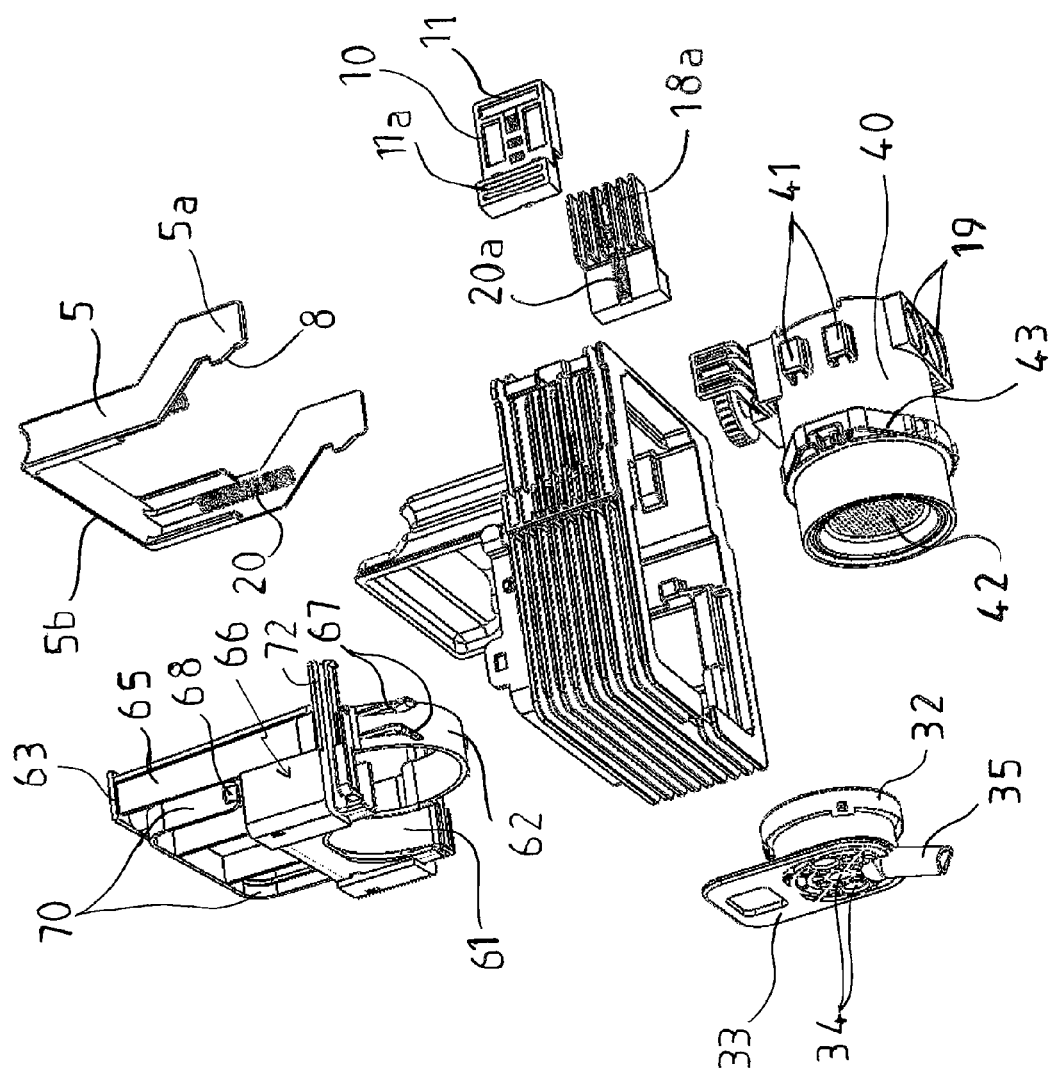
FIG. 1 is a bottom perspective view of a removable infusion unit according to the invention, the various elements to be inserted in said infusion unit being shown spaced from the infusion unit to be more visible.
Figure 2:
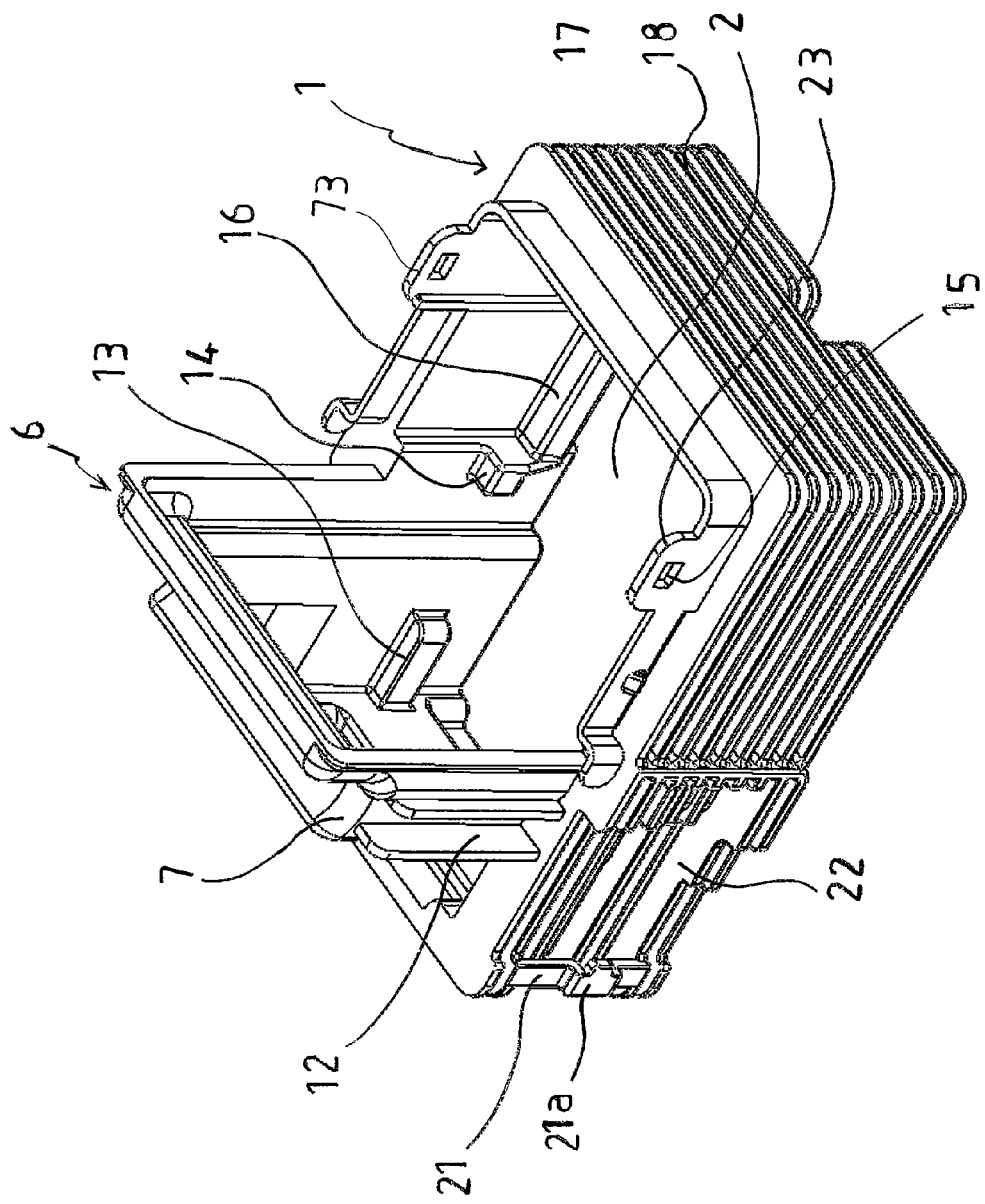
FIG. 2 is a top perspective view of the infusion unit according the present invention, said infusion unit being shown without the elements inserted into the interior thereof in order to enable the various receiving means to be seen better inside the unit.
Figure 3:
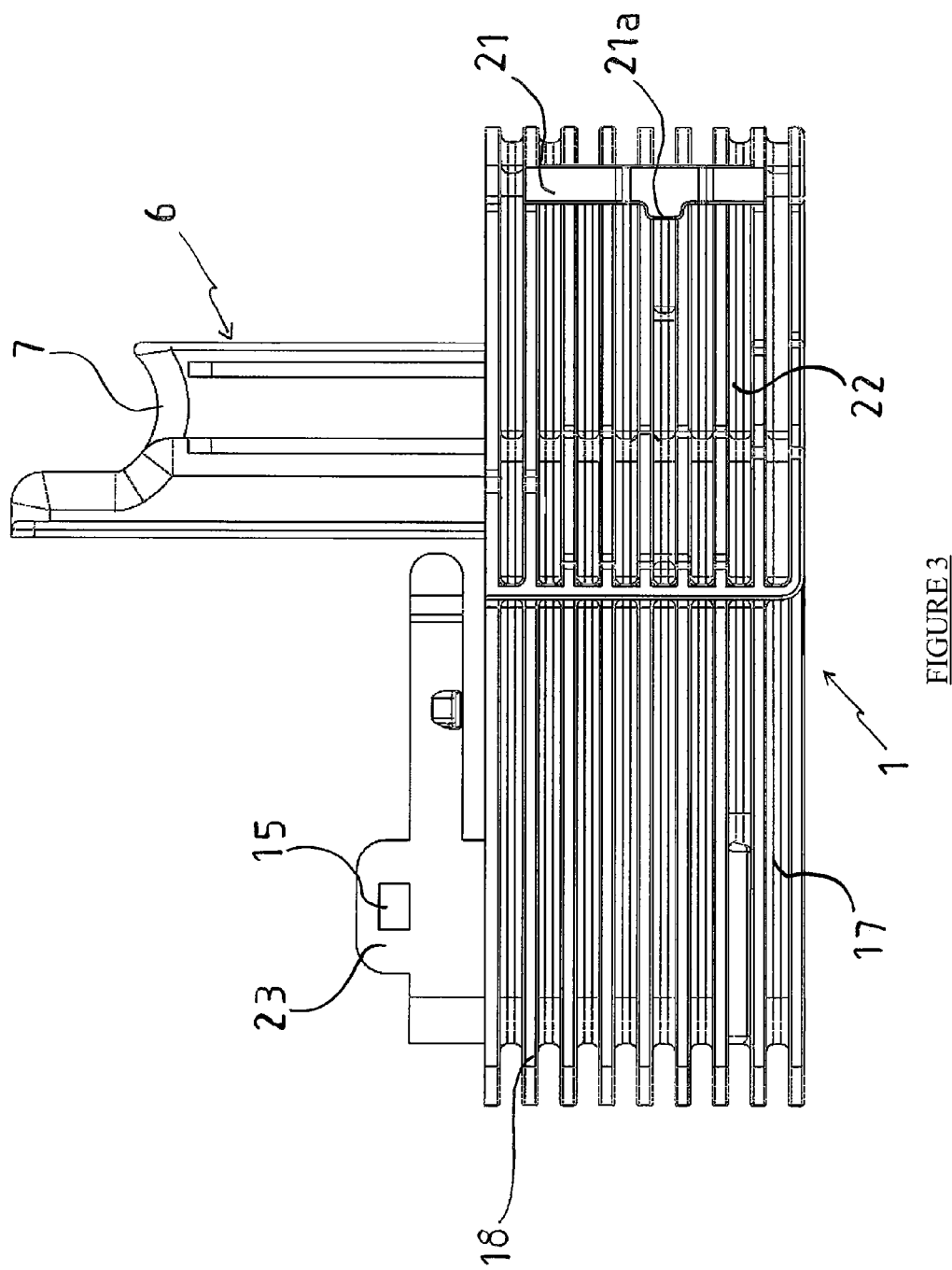
FIG. 3 is a lateral view of the infusion unit according to the present invention, said infusion unit only comprising in said figure the gripping member thereof and the locking means thereof.
Figure 4:
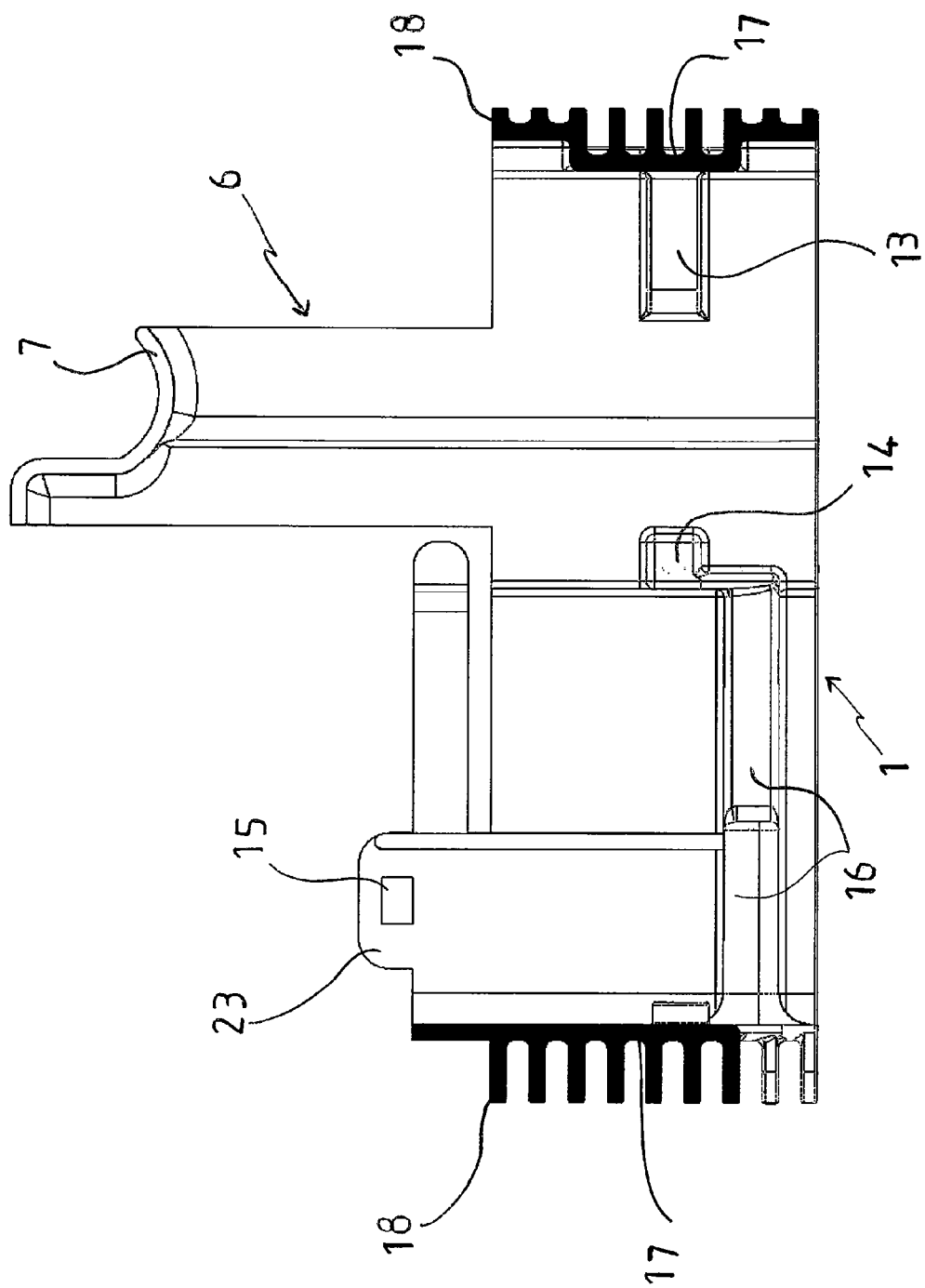
FIG. 4 is a longitudinal section of an infusion unit according to the present invention, said figure making it possible to see the reinforcement means of the belt of the unit and the various receiving means specifically suitable for an element to be inserted inside the unit.
Figure 5:
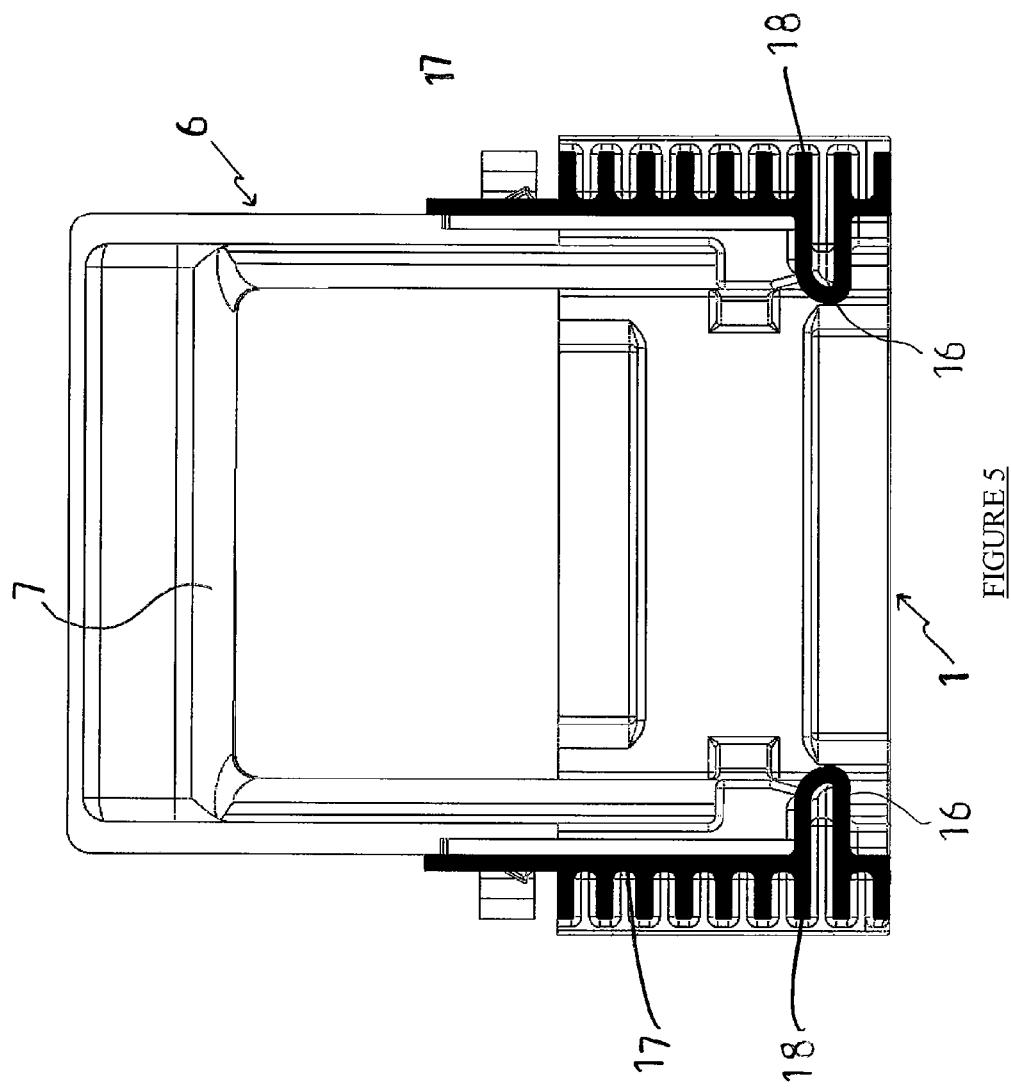
FIG. 5 is a lateral section of an infusion unit according to the present invention, said figure making it possible to see the reinforcement means of the belt of the unit from an angle of view other than in FIG. 4.

Before describing the invention in further details some optional but advantageous features will be mentioned. These features can be used alone or in combination, Optionally, the invention further includes at least any one of the following facultative and non limitative features:

- the means or the structure for taking up the forces are at least one reinforcement rib, arranged on at least one of the faces of the belt around the outer perimeter thereof, said rib extending lengthwise of said face of the belt. Said rib or ribs procure an increase in section of the belt that is advantageous for reducing the stresses induced on the belt.
- said other half-chamber is fixed in relation to the belt. Alternatively, it may include a mobility, for example to complete the moving closer motion performed by the mobile half-chamber and to provide the sealing of the extraction chamber.
- a plurality of ribs is provided for the face of the belt, said ribs extending in parallel. A tiered assembly of ribs is obtained distributed on at least one face of the belt.
- the ribs have a thickness equal to the thickness of the wall of the belt supporting said ribs. This is sufficient for enabling said ribs to fulfil the role thereof of means or structure for taking up the forces procuring more inertia to the belt in order to limit the deformations thereof under load and also facilitate the manufacture, in particular by moulding of the belt having such ribs.
- according to the function of the associated inserted element thereof, the receiving means or member may be removable attachment means or member, means or device enabling the movement inside the unit or support means or member of said element. Thus, a holding or support of an element is obtained specifically adapted to said element.
- the driving means or driving device are grouped in a body having on each of the lateral portions thereof two projecting portions forming a gap between them intended to respectively receive a sliding rail supported by the inner space of the infusion unit defined by the belt, said rails forming the first receiving means or member for the driving means or device. This has the advantage of forming a compact driving assembly and not requiring receiving means or member for each element contained in the body. Moreover, with such an arrangement, a vertical movement of the body is rendered impossible, a movement that could occur due to the hydraulic pressure to which the body is generally subjected. The use of a rail represents an advantageous guidance in position during the installation of the body and enables the threes to be distributed over a longer length of the belt
- the face of the body opposite that facing the fixed half-chamber and adjacent to the two lateral faces is resting against an inner face of the belt. Thus, a contact is obtained between body and belt over a large portion of the belt with a load for taking up the forces of any said portion rather than a localised load.
- the front portion of the body on each of the lateral sides thereof is supported by a lug supported by the inner space defined by the belt, said lugs forming the second receiving means or member for said driving means or device,
- the body includes a ring-shaped component surrounding said body at least partially and snapping onto each of said lugs,
- the snapping-on of the ring-shaped component pre-compresses a return means or device for the driving means or device enabling the driving means or device to be returned from the applied position of the mobile half-chamber against the fixed half-chamber. Said last three features provide better support of the body in the belt and the last feature, whilst procuring second receiving means or member, enables a means or member included in the body to be placed in operation simultaneously with the mounting of said body onto the belt.
- the driving means or device include a cylinder. Said means is one of the most suitable for moving a mobile half-chamber.
- the mobile half-chamber and the driving means or device thereof are grouped in the body, the mobile half-chamber maintaining a freedom of movement lengthwise of said body. Thus, a compact body is obtained requiring fewer receiving means or member than the elements inserted one by one.
- the fixed half-chamber comprises on the rear face thereof, opposite that facing the mobile half-chamber, a support plate, said plate comprising recesses engaging with studs provided on an inner front face of the reinforcement belt, said studs forming the receiving means or member of the belt for the fixed half-chamber. The attachment of the fixed half-chamber is therefore opposite the body and the driving means or device of the mobile half-chamber pins the mobile half-chamber against the attachment thereof thus preventing said half-chamber from undoing unexpectedly.
- the inserted elements in the inner space of the unit include an upstream and downstream closing device of the fixed and mobile half-chambers, said device being supported by a fixed assembly intended to be attached to the belt, said fixed assembly comprising means for guiding the dose to be infused, a pin being arranged on each lateral portion of the fixed element, the pin being, in mounted position of said fixed assembly in the infusion unit, facing a protrusion of the lateral portion of the belt having an aperture for the insertion thereof, said apertures forming the receiving means or member for the attachment of the fixed assembly onto the belt. The presence of such a closing device in the unit is advantageous for the correct operation of the intake and evacuation of the extraction chamber. Although advantageous, the closing device is optional within the scope of the invention, the closing device has a slide on each of the lateral sides thereof, said slide engaging with a guide rail provided on each lateral face of the fixed assembly supporting the upstream and downstream closing device of the extraction chamber. The closing device finds the place thereof against the inner lateral reinforcements of the belt, the shape of which increases the cross-section and the geometric inertia thereof, which enables the forces exerted to be distributed over a larger portion of the belt.

the closing device is positioned resting, for each of the lateral sides thereof, on a lateral reinforcement provided on each inner lateral face of the belt, said lateral reinforcements enabling the section of the belt and the geometric inertia thereof to be increased locally to provide the mechanical strength thereof.

the unit includes the locking means or device of the unit for the attachment thereof inside the machine and the actuation means or device for the locking and/or insertion into or separation of the unit from a component part of the machine. The advantage procured by the presence of actuation means or device for activating the locking or unlocking of the locking means or device is that said actuation means can be rendered more easily accessible to an operator than would be the locking means which are mainly housed between an infusion unit and a container and therefore difficult to access. This has the advantage of having a safe and economical locking system for the locking or unlocking of the infusion unit, said system being simple to produce. The dual function of actuation means for the locking also acting as transportation means or device for the unit is also advantageous.

the peripheral belt symmetrically supports the locking means, the locking means or device being received in a housing on each outer lateral face of the belt and sliding laterally to the belt on said outer lateral face, the locking means including raised patterns that are complementary to the reinforcement ribs of the belt and configured to provide the translational guidance of the locking means on the belt. Thus, the ribs in addition to the function thereof of reinforcing the belt may have a second function, which enables two functions to be achieved with a single element.

the actuation means or device are arranged so that in the deactivation position thereof, the locking means prevent the unit from being disconnected from the container and that in the activation position thereof, the locking means allow the unit to be disconnected from the component part of the machine, the actuation means are supported by the unit and include a manual control element such as a handle or a button intended to be pulled, pressed or rotated, said control element being hinged onto the unit and configured to participate, at least partially, in the gripping of the unit in view of the insertion thereof into or separation thereof from the component part of the machine. A control element in the form of a handle or a button enables the operator to easily activate the locking means.

the control element is a handle configured to be moved during the actuation thereof and engaging with the associated locking means such that the movement of the handle results in a movement of the locking means.

the handle is slidably mounted on the unit and configured such that a sliding of the handle results in a sliding of the associated locking means in a direction perpendicular to that of the handle. This has the advantage of making it possible to enable the locking means to slide in a horizontal plane whereas the handle slides in a vertical plane, which is the most suitable sliding for a handle.

above the housing is provided a transverse post with a lug, the housing and the post forming the means or member for receiving the arm of the control element on the outside of the belt, a gripping member is attached to the unit and shaped such that a user can grasp simultaneously and with a single hand the control element and the gripping member.

the unit is arranged such that a pressure applied on the control element allows the unit to be disconnected from the component part of the machine and that a tension exerted on the control element and the gripping member separates the unit from the component part of the machine. Thus, the actuation means are operational by pressure and the means for removing the infusion unit from the container are operational by tension, said two motions being particularly appropriate for a control element such as a handle, the tensile motion also being the most suitable motion for removing the infusion unit from the container receiving said unit.

The invention also relates to a container forming a component part of the machine including in the inner space thereof such an infusion unit, wherein locking means are provided that are complementary to the locking means supported by the infusion unit.

Advantageously, the locking means of the unit and of the container are of the bolt-type supported by either the unit or the container engaging with a strike supported by the other.

Advantageously, the container includes at least one hydraulic connector and the unit includes at least one complementary connector for providing the hydraulic supply of the unit and wherein the locking means are distributed on either side of the connectors thus preventing the rotation of the unit when exposed to a pressure from the fluid supplying said unit. This increases the stability and the strength of the infusion unit during the hydraulic supply.

In the following, upstream and downstream will be qualified as the portions of space respectively arranged before and after a point considered relatively to the normal path of a dose in the machine during a cycle for preparing a beverage.

The faces of the infusion unit that are the longest and supporting the locking means will be referred to as lateral faces, the adjacent faces thereof being called respectively front face when it is the face the farthest from the locking means and that supporting the fixed half-chamber and rear face in the other case where said face supports the driving means or device of the mobile half-chamber. The designations inner or outer for the parts correspond to a place respectively rotated towards the interior or opposite the interior of the infusion unit or of the container.

In FIG. 1, the various elements inserted into or positioned on the infusion unit of the machine for making beverages by means of the extraction of a product to be infused can be seen, said elements being placed at a distance from the infusion unit. Said elements of the machine are at least for one portion thereof made from plastic and include means specific to each element engaging with the complementary receiving means supported by the infusion unit 1.

By receiving means, it is understood means specifically adapted to an element to be inserted. Thus, said receiving means may be permanent attachment means, such as for example for the gripping member 6 which advantageously forms a single and same component with the infusion unit. Said receiving means may also be removable attachment means, as for the fixed assembly 66 and also sliding means as for the closing device 60 as well as support means some of which contribute to the insertion of the associated element inside the unit.

In particular, this is the case for the sliding means of the body 40 including the driving means or device. This also applies to the removable attachment means of the body which are arranged towards the front of said body and place under tension a component inserted into said body as will subsequently be seen.

In the inner space of the infusion unit 1 may be inserted a fixed assembly 66 with means for guiding the dose to be infused taking in the figures the form of a hopper and supporting a closing device 60 freely moving in relation to the fixed assembly 66, a fixed half-chamber 32 and a mobile half-chamber 42, said mobile half-chamber 42 having driving means housed in a body 40. In the figures, the mobile half-chamber 42 is housed in the body 40 with the driving means thereof but this is not at all mandatory, the mobile half-chamber 42 being able to form a separate component from the body 40 and be inserted into the unit independently of the driving means thereof then connected to same.

Moreover, laterally to the unit, locking means 10 as well as the actuation means 5 thereof may also be rigidly connected to the infusion unit 1. This will subsequently be described in detail.

The infusion unit 1 may be housed in a container 3. This is not limiting and the infusion unit 1 may be rigidly connected, for example, to a component part of the machine without being housed therein. The insertion of the infusion unit 1 into the container 3 is shown in particular in FIG. 14. The container 3 is thus used as a support element for the infusion unit 1 receiving said unit in the inner space 4 thereof but also for the pressurised hot water supply of said unit 1.

Figure 10:
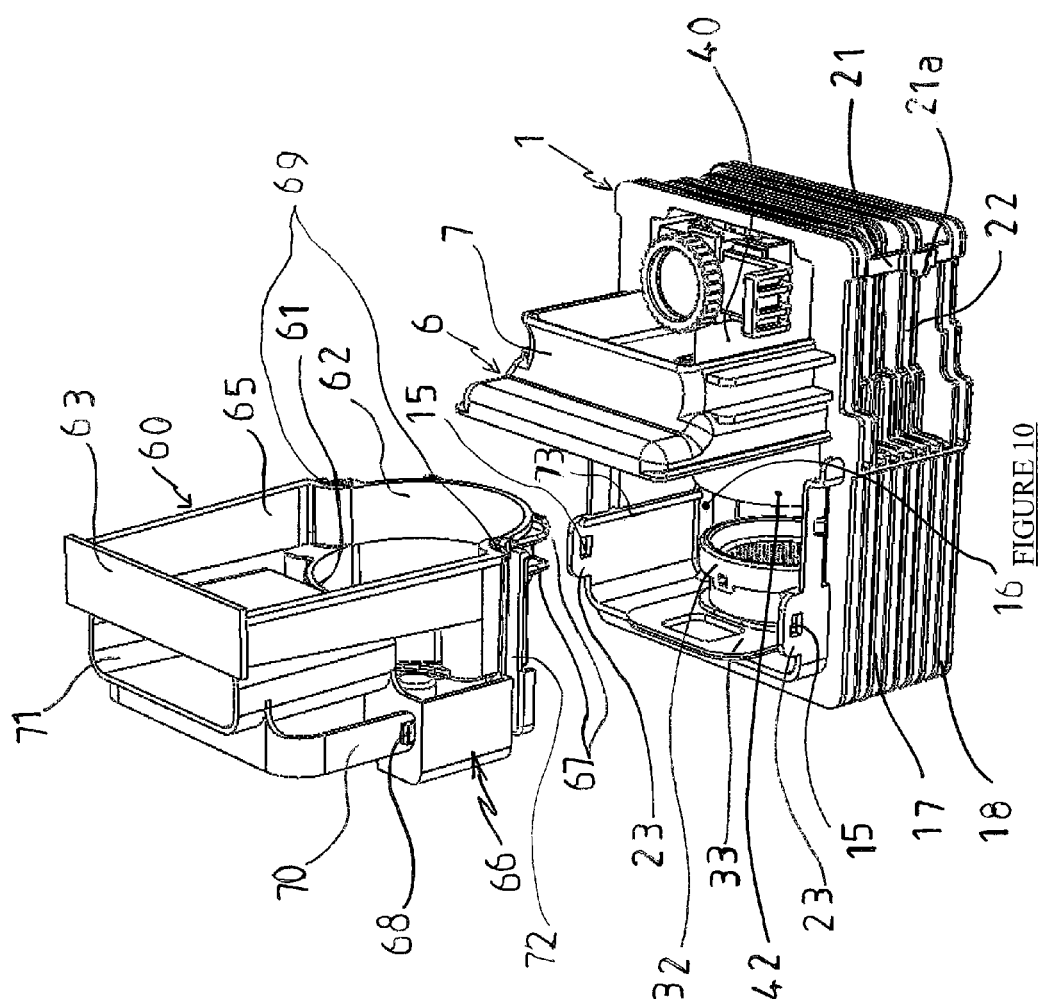
FIG. 10 is a perspective top view of an infusion unit according to the present invention, the fixed assembly comprising the closing device being shown spaced from the inside of said unit before the insertion thereof into the unit.
Figure 11:
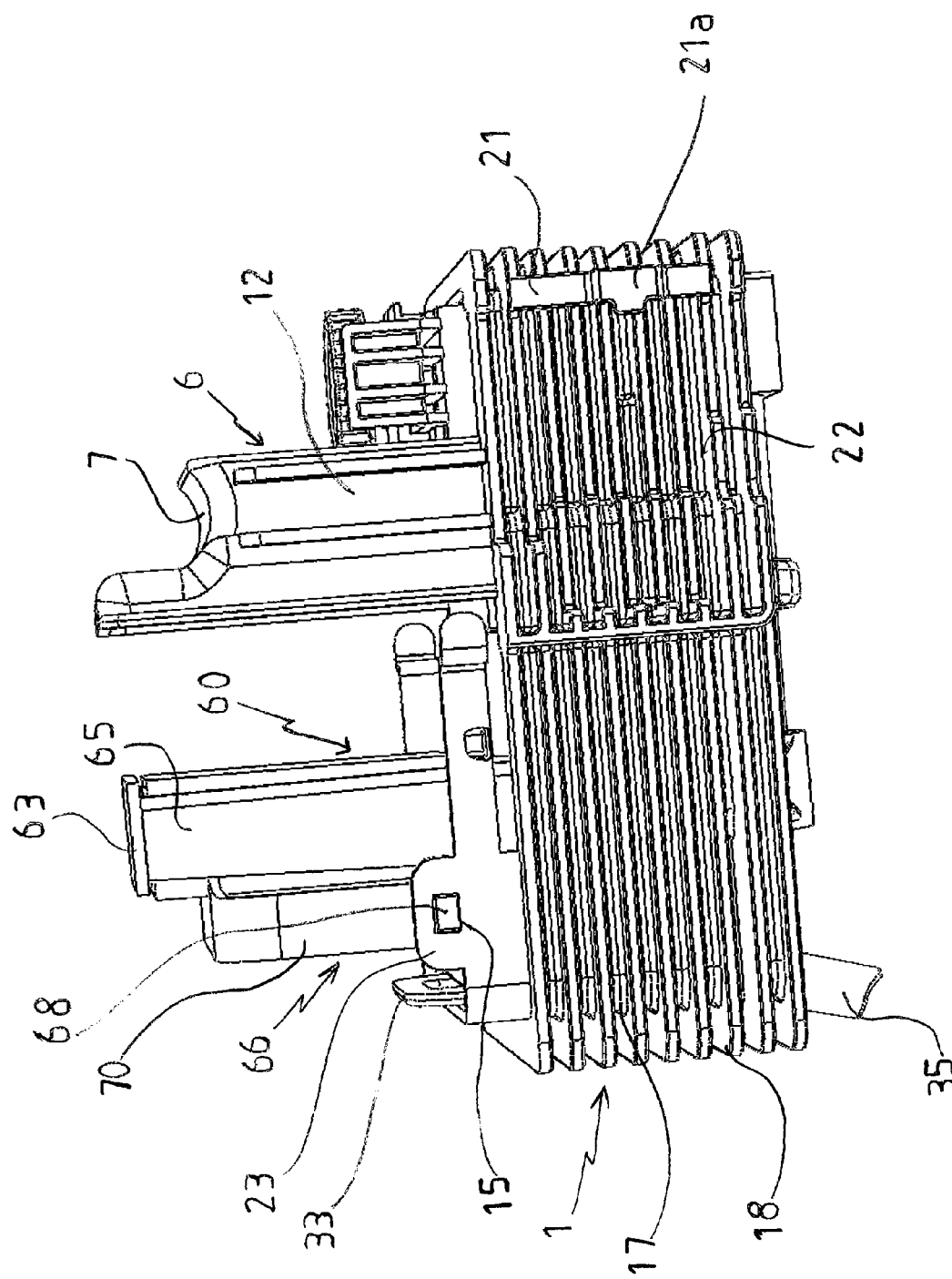
FIG. 11 is a perspective lateral view of an infusion unit according to the present invention, the fixed assembly and the closing device thereof that said assembly supports being inserted into the unit, the device being in a first position.
Figure 12:
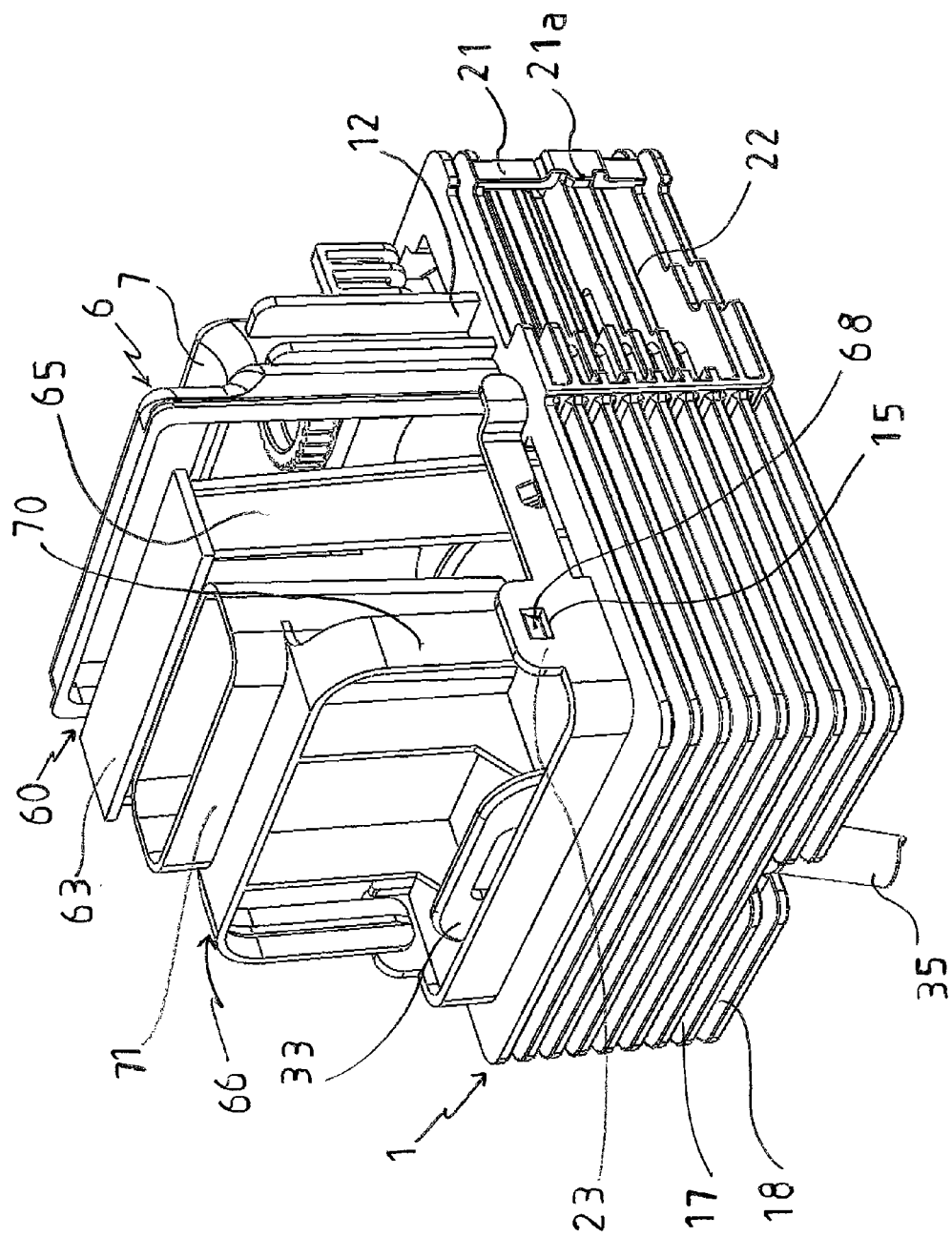
FIG. 12 is a perspective view from an angle of view other than FIG. 11 of an infusion unit according to the present invention, the fixed assembly supporting the closing device being inserted into the unit and the device being in a second position other than that shown in FIG. 11.

In mounted position of the fixed 32 and mobile half-chambers 42, as can be seen in particular in FIG. 10, the mobile half-chamber 42 is facing the fixed half-chamber 32 and at a distance therefrom. During the closing of the two half-chambers 32 and 42 to form the extraction chamber of the unit, the mobile half-chamber 42 is translationally driven by the driving means thereof housed inside the body 40 and rests against the fixed half-chamber 32. The driving means, that may advantageously be in the form of a cylinder, also provide the sealed closing of the chamber during the phase for infusing the product trapped between both half-chambers 32 and 42, said infusion being carried out under high pressure.

The product is advantageously contained in a dose. Each of the half-chambers 32 or 42 has an end defining a perimeter contained in a plane substantially perpendicular to the longitudinal axis of the infusion unit 1. Reference will be made to the document WO-A-2008/142040 for the description of such a machine for making beverages.

The main elements to be inserted into the infusion unit 1 may be the fixed half-chamber 32, the mobile half-chamber 42 and the driving means thereof, said last two elements being advantageously grouped in a single element under the name body 40 of the driving means.

As previously mentioned, the higher the infusion pressure the greater the closing force of the two half-chambers 32 and 42 must be significant to provide the sealing during the infusion. The significant force applied on the fixed half-chamber 32 by the actuation means causes in reaction a force just as significant but in the opposite direction on said driving means and the mobile half-chamber 42, which may result in the destruction at least partial of the machine for preparing beverages under high pressure.

Moreover, during the infusion of the dose, the hydraulic system of the machine is subject to a vertical thrust proportional to the projected surface thereof and to the pressure of the water which passes through said hydraulic system. Said vertical hydraulic pressure is, for example, very high during the infusion of expresso coffee which requires a pressure greater than 8 bars or even greater than 15 bars or 20 bars. It is advisable to provide a holding of the inserted elements in the infusion unit 1 as well as its own holding when the infusion unit is placed in a component part of the machine such as the container 3 against the high pressure hydraulic thrust during the infusion and/or during the thrust phase of the driving means.

The holding of the elements 32, 40, 42, 60, 66 in relation to the infusion unit 1 in the machine requires the forces to be taken up by a robust fastening assembly which must nevertheless remain easy to handle by the end user of the machine. Furthermore, as previously mentioned, said holding must not increase the space requirement of the infusion unit 1 or hinder the assembly thereof or the disassembly thereof into or out of the container 3.

On the other hand, it is advantageous that the assembly of the inserted elements 32, 42, 60, 66 in the infusion unit 1 of the machine for preparing beverages under high pressure, said elements being rigidly connected with or supported by a portion of said unit 1, is carried out as simply as possible, taking into account the role of the inserted element in the unit 1 and the forces that are applied thereto.

According to the present invention, a dosed belt 17 is provided forming the periphery of the infusion unit 1. Said belt 17 is advantageously made from engineered plastic material and comprises reinforcement means for supporting the forces transmitted by at least one inserted element. In the figures, said reinforcement means are in the form of reinforcement ribs 18 on the perimeter thereof to support the enormous stresses during the infusion at over 20 bars. Said ribs 18 advantageously extend along each side of the belt 17 lengthwise of said side. There can only be one rib 18 on at least one face but it is preferred to have rows of ribs 18 which extend in parallel lengthwise of the face, therefore horizontally when the infusion unit 1 is in the position thereof mounted in the machine.

The use of ribs 18 provided on the belt 17 is a particularly advantageous but non-limiting feature of the present invention. The important features of the belt 17 are firstly that the belt 17 includes means for taking up the forces generated while infusing on at least one element and secondly that the reinforcement belt includes appropriate receiving means for at least one inserted element.

As regards the receiving means, same are distributed inside the belt 17 so as to optimise the overall taking up of the forces generated during the infusion, for example, causing no discontinuity in the inner geometry of the belt 17.

Advantageously, plastic materials are used, preferably injected for manufacturing the belt 17 and other elements. Said plastic materials may be of various types, for example, carbon, kevlar or glass-fibre reinforced polymer-based engineered plastics. Indeed, said plastic materials make it possible to achieve mechanical characteristics similar to those of light metals such as aluminium.

Thus, the body 40 including the driving means and the mobile chamber 42 may be made from plastic material, said means possibly advantageously being a cylinder, the handle 5, the two half-chambers 32 and 42, the fixed assembly 66 and the closing device 60 as well as the means for locking 10 the infusion unit 1 onto the container 3.

The possible replacement of steel components with engineered polymer components such as, for example, carbon or glass-fibre filled polysulfone or carbon or glass-fibre filled polyphtalamide requires a larger section to withstand the equivalent stresses and may not necessarily result in a reduction in the overall volume of the infusion unit or of the machine.

The belt 17 has a substantially parallelepiped shape and hollow in the middle thereof, thus forming an inner space 2 in the unit 1. This shape is hollow in order to be able to install the body 40 of the driving means from the bottom of the unit 1, said means advantageously consisting of a fixed cylinder chamber and a mobile piston sliding inside the chamber of the cylinder forming said body.

The mechanical strength of the belt 17 against the forces generated by the hydraulic cylinder acting as driving means is provided by a significant cross-section, advantageously required for reducing the stresses induced to values permissible by the engineered plastic. The maximum permissible stresses of an engineered plastic are considerably lower than those of a steel, in a ratio of 1 to 5, which, with an equal force, increases with the same proportion the volume of plastic material to be implemented for providing the mechanical strength.

To contain the volume and the weight of the belt 17 within the required ranges of values, it is envisaged to add multiple horizontal ribs 18 perpendicular to the vertical wall of the belt 17, when the belt is in place in the unit 1. Advantageously, said ribs 18 are distributed in a plurality of levels on the outer perimeter of the belt 17 in order to render the component mouldable. The distribution of the ribs 18 in a plurality of levels enables a thickness of each rib 18 to be installed that is identical to that of the vertical wall of the belt 17 to provide optimum moulding whilst procuring same greater inertia to limit the deformations thereof under load.

Figure 13:
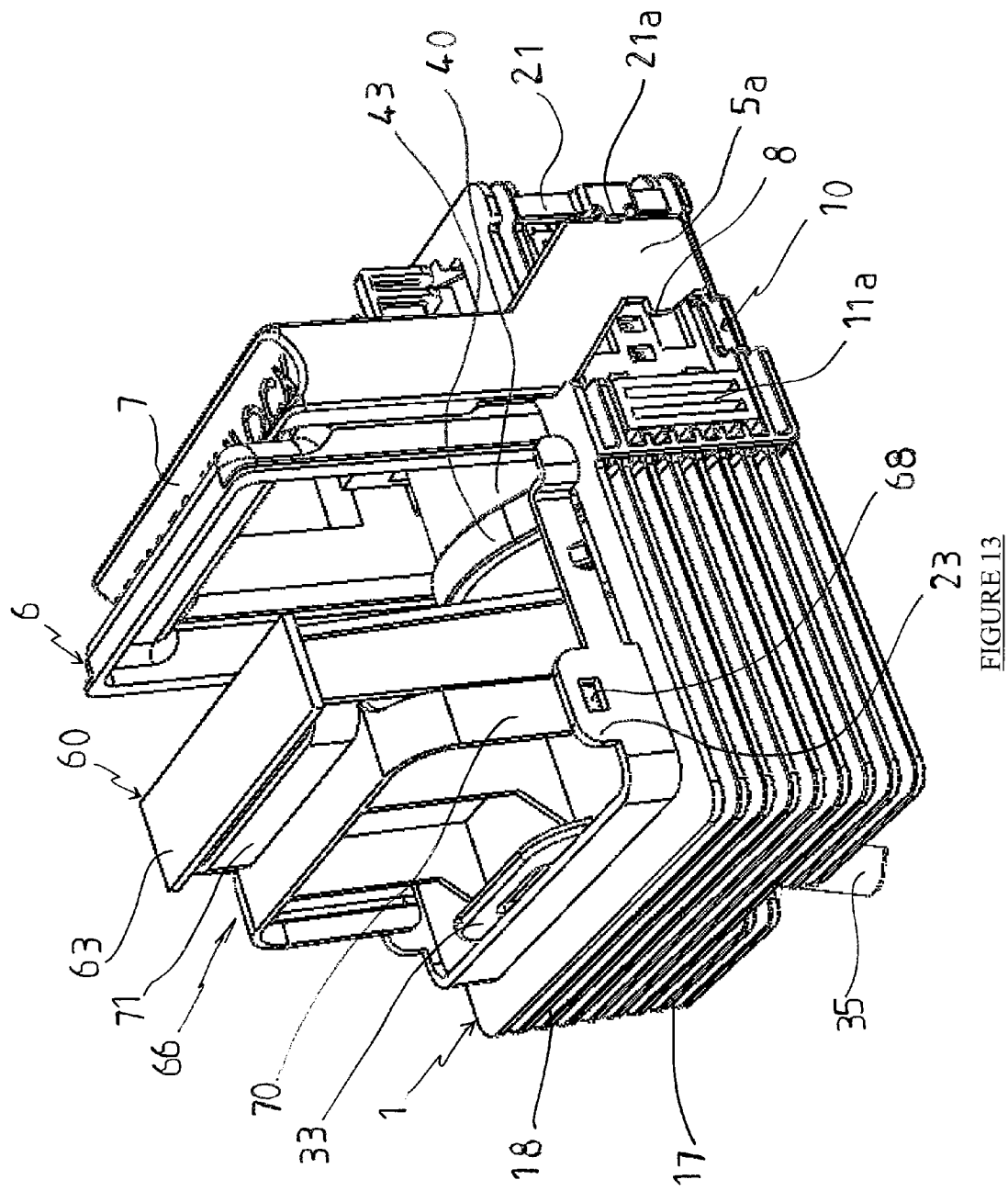
FIG. 13 is a perspective view from an angle of view other than FIG. 12 of an infusion unit according to the present invention, the totality of the elements to be inserted into the infusion unit being in place in said unit, as well as the locking means on the outer face of each lateral side of the infusion unit and the actuation means thereof.
Figure 14:
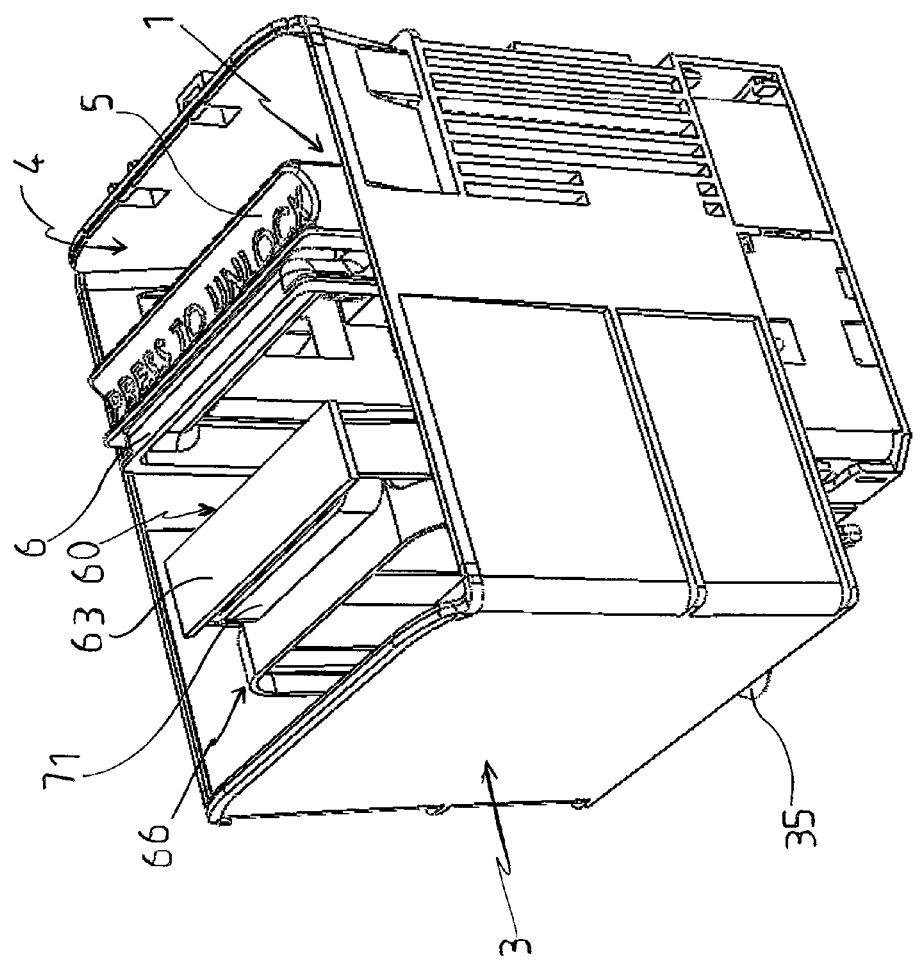
FIG. 14 is a perspective lateral view of a container according to the present invention, the container illustrating a component part of the machine receiving in the interior thereof the infusion unit.

As is shown in FIG. 14, such a globally parallelepiped infusion unit 1, may be installed in a container 3 rigidly connected to the expresso coffee machine to provide the positioning thereof within the machine. The end edge of the ribs 18 of the belt 17, not visible in FIG. 14 but visible in FIGS. 1 to 13, provide the centring and guidance of the infusion unit 1 in said container 3.

The main inserted elements in the unit 1 will now be described as well as the receiving means provided specifically in the unit 1 for the insertion thereof.

In the embodiment presented, one of the half-chambers, henceforth referred to as fixed half-chamber 32, is rigidly connected to the infusion unit 1 of the machine. The other half-chamber, referred to as mobile half-chamber 42, is supported by a body 40 also including the driving means.

Within the scope of the embodiment shown, one of the half-chambers 32 or 42 has a water inlet pipe capable of receiving the mouth of a hot water circuit 100. Conventionally, the hot water circuit 100 comprises a tank 200, a boiler 400 enabling the temperature of the water of the tank 200 to be increased to a required temperature in view of the infusion thereof in the extraction chamber, as well as a pump 300 enabling the pressure of the water in the circuit to be raised.

During the infusion, the two half-chambers 32 and 42 are held firmly in contact with one another and define a sealed volume for receiving the dose. The sealing may be produced by applying the perimeters of the two half-chambers 32 and 42 on the perimeter of the dose which therefore acts as a seal. The sealing may also be provided or be reinforced by related sealing means. The half-chambers 32 and 42 are capable of being arranged in mutual contact by inserting between them a dose to form a sealed volume acting as an extraction chamber. However, the invention does not imply in any way that the two half-chambers 32 and 42 mutually have any symmetry.

The fixed half-chamber 32 comprises on the back thereof a support plate 33 as well as on the lower portion thereof a pipe 35 for evacuating beverages in fluidic communication, on one hand, with the inside of the extraction chamber and, on the other hand, with a beverage outlet. The evacuation pipe 35 is intended to provide the evacuation of the beverage resulting from the infusion of the dose, towards a container such as a coffee cup.

After infusion, when the mobile half-chamber 42 is moved apart from the fixed half-chamber 32, the extraction chamber is therefore open, the dose already infused is therefore no longer clasped in the extraction chamber previously formed by said two half-chambers 32 and 42. Said dose is evacuated from the chamber by gravity and falls into a recovery tray.

In the method according to the invention for inserting the elements 32, 40, 42, 60, 66 into the unit 1, first of all the driving means of the mobile half-chamber 42 are inserted.

As regards the receiving means of the driving means of the body 40, the inner space 2 of the infusion unit 1, defined by the belt 17, includes on each of the lateral sides thereof a rail 13 for sliding the body 40 of the driving means thereon. Thus, the body 40 is installed resting against the inner face of the rear part of the belt 17 having been slidably guided in said position on the rails 13. For this purpose, the body 40 advantageously includes on each of the lateral sides thereof two projecting portions 41 forming a gap between them and intended to respectively receive a sliding rail 13 supported by the inner space.

The engagement between the rail 13 and projecting portions 41 flanking said body also has the advantage of holding the body 40 in the infusion unit 1 when a vertical thrust transmitted by the hydraulic connectors 19 is communicated thereto, the vertical movement of the body 40 being limited from bottom to top as well as from top to bottom.

Figure 6:
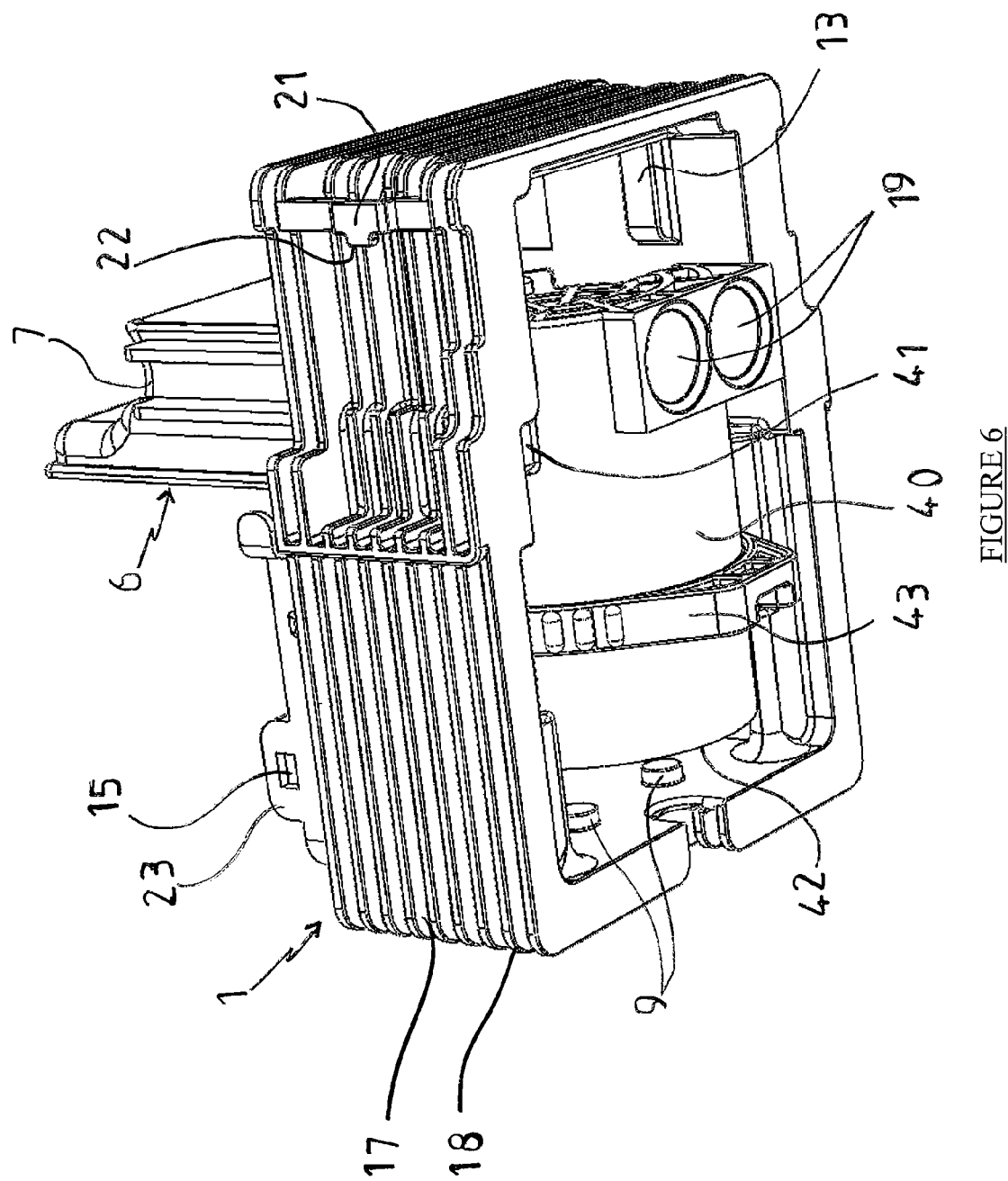
FIG. 6 is a perspective bottom view of an infusion unit according to the present invention, the body of the driving means of the mobile half-chamber as an element to be inserted into the unit being installed inside said unit.
Figure 7:
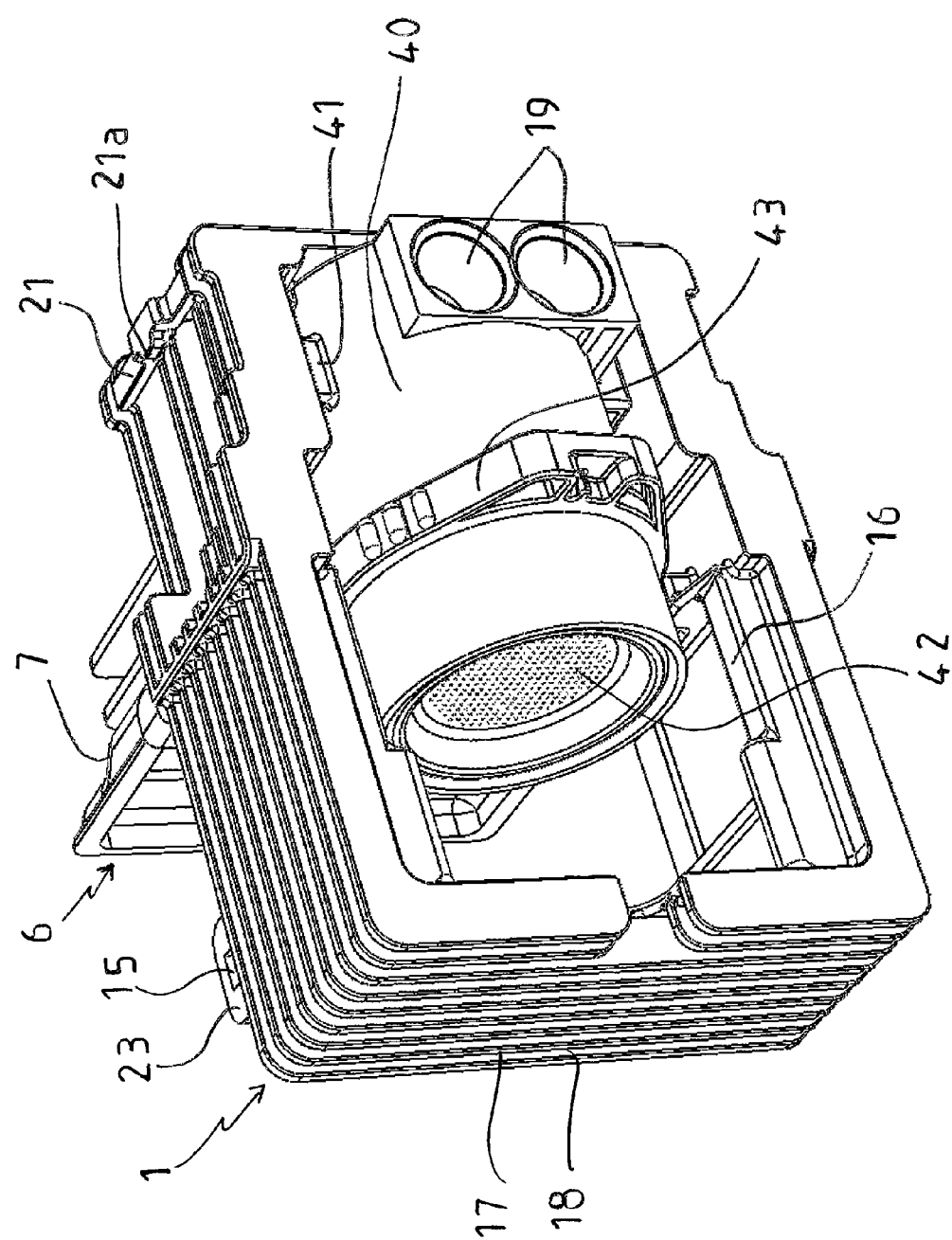
FIG. 7 is a perspective bottom view of an infusion unit according to the present invention, the body of the driving means of the mobile half-chamber as an element to be inserted into the unit being in final position of installation inside said unit.
Figure 8:
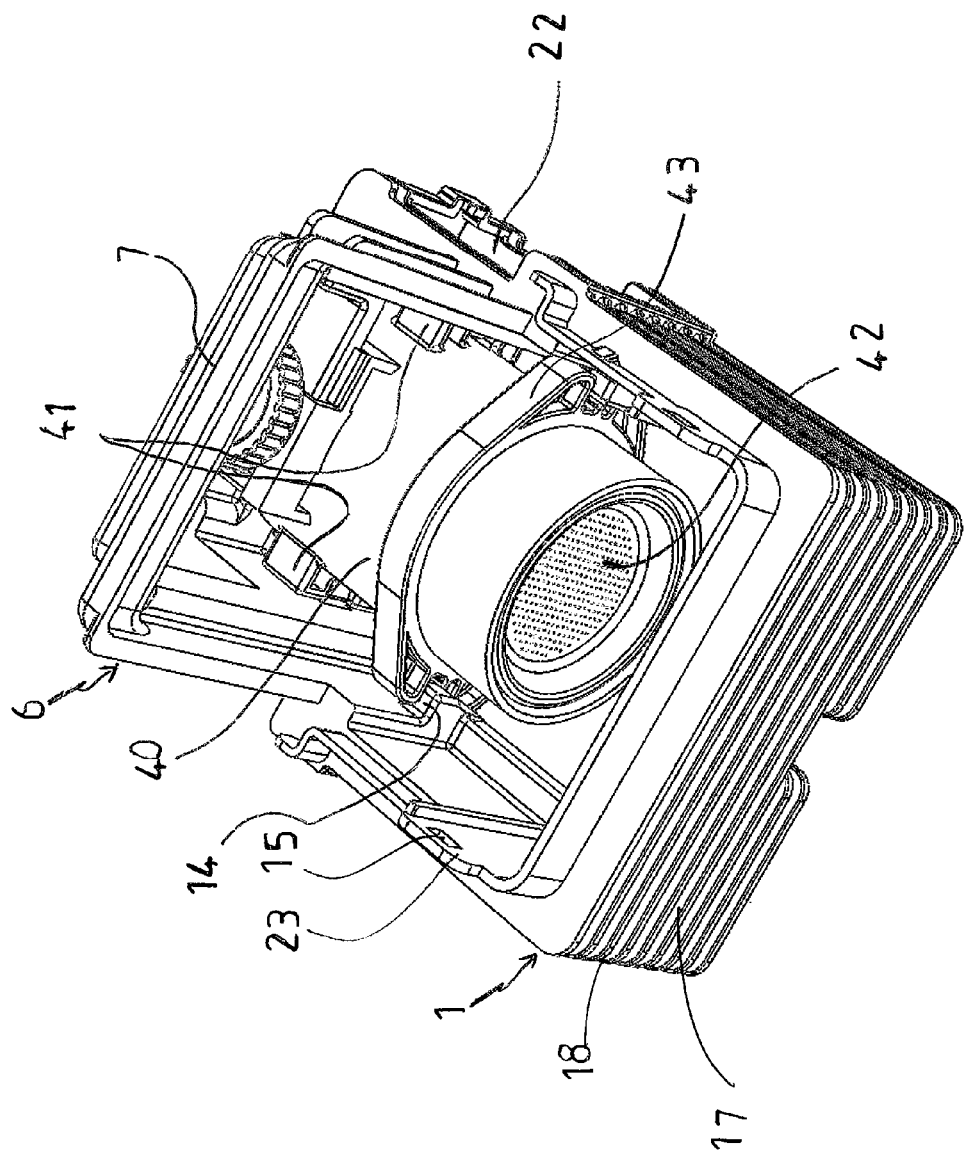
FIG. 8 is a perspective top view of an infusion unit according to the present invention, showing in particular the ring-shaped element flanging the body of the driving means in final position of insertion of the body inside said unit.
Figure 9:
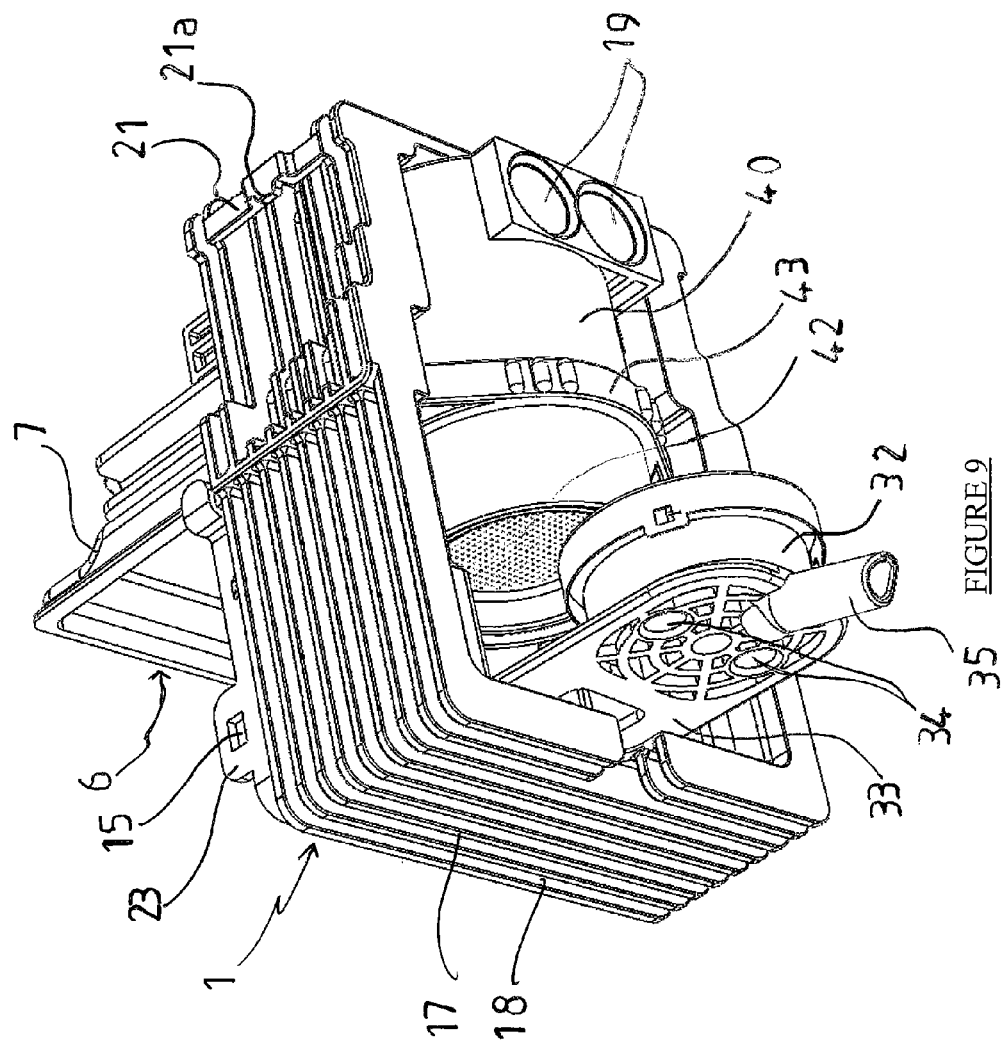
FIG. 9 is a perspective bottom view of an infusion unit according to the present invention, the fixed half-chamber as an element inserted in the unit being installed inside said unit.

The installation of the body 40 of the driving means inside the infusion unit 1 is shown in particular in FIGS. 6 and 7, for which the body 40 is firstly inserted through the lower cavity of the infusion unit 1 of the side of the front face of said unit 1, front face which supports the fixed half-chamber 32 when said half-chamber is inserted and which is therefore the face opposite that which supports the body in inserted position in the unit 1. The body 40 is then slid towards the rear face of the unit 1 on the rails 13 installed on the faces adjacent to the rear face of the unit 1 which is the supporting face thereof in inserted position.

During operation, return means are provided to replace the driving means of the mobile chamber 42 in the position thereof moved apart from the fixed chamber 32. In the case of use of a cylinder as driving means, a return spring, enabling the cylinder piston to be returned in the absence of pressure, is installed in pre-compression between the outer face of the piston and a ring-shaped component 43 surrounding at least partially the body and advantageously in the form of a flange. The component 43 is advantageously made of injected plastic material and is resting on a lug 14 arranged on each of the two inner faces of the belt 17 adjacent to the support face of the body 40, said lugs 14 being used as snap-on raised patterns for the ring-shaped component 43. The body 40 is thus wedged against the inner support face thereof of the belt 17. The component 43 is advantageously snapped on by rotating said component 43 one quarter-turn.

The fixed half-chamber 32 is then inserted into the infusion unit 1. The recesses 34 made in the plate 33 on the back of the fixed chamber 32 and opposite the opening thereof are visible in FIGS. 1 and 9. The inner space 2 of the unit 1 defined by the belt 17 also supports on the front face thereof studs 9 engaging with the recesses 34 made on the plate 33 on the back of the fixed half-chamber 32, said studs 9 being visible in FIG. 6. A contrary arrangement, i.e. studs supported by the plate and recesses supported by the belt 17 is also possible. This may also be applied to other receiving means.

The fixed half-chamber 32 is therefore installed on the face opposite that of the support face of the body 40 of the driving means. The fixed half-chamber 32 is held resting on the two studs 9 of the belt 17 by insertion between said belt and the mobile half-chamber 42 of the fixed assembly 66 supporting the closing device 60 that is able to slide in relation to said assembly 66.

When the mobile half-chamber 42 does not form part of the body 40 of the driving means, said mobile half-chamber is inserted into the infusion unit 1 before or after insertion of the mobile half-chamber 32 and rendered rigidly connected to the end of the driving means rotated towards said half-chamber, for example from the end of the rod of a cylinder the travel of which thus provides the sealed closing of the half-chamber 42 by moving said half-chamber closer to the fixed half-chamber 32.

Another component part of the machine for making beverages is the closing device 60 rigidly connected to a fixed assembly 66 supporting guiding means in the form of a hopper 71, with freedom of sliding of said closing device 60 in relation to the fixed assembly. In FIG. 1 as in FIG. 11, said hopper is hidden by the blocking means 63 of the closing device 60 because positioned just below said device but the hopper 71 is in particular visible in FIGS. 10 and 12.

Said hopper 71 is used as means for guiding the dose and is capable of preventing any significant motion of the dose in a horizontal plane whilst allowing the vertical movement thereof. It is arranged so as to provide the guidance of the dose upstream of the upstream closing means 61. Furthermore, the hopper 71 is arranged so as to be positioned opposite the opening of the extraction chamber in the first position in order to allow a dose to be inserted into said latter when the upstream closing means 61 are retracted. In the second position, it is arranged so as to be arranged substantially in front of the chamber.

Furthermore, the hopper 71 is vertically arranged so as to be close enough to the upstream closing means 61 to provide the holding of the dose when said latter is resting on the upstream closing means 61 of the closing device 60. Thus, when a dose is resting on the upstream closing means 61 and that said latter translate forwards, the hopper 71 contributes to preventing any substantial longitudinal translation of the dose. Said latter is therefore held opposite the opening of the extraction chamber when the upstream closing means 61 are totally retracted. The relative motion of the closing device 60 and of the hopper 71 thus enables the dose to be transferred from the upstream closing means 61 to the chamber. Furthermore, said relative motion enables the integrity of the dose to be protected during said transfer.

The hopper 71 is supported on the face thereof opposite the closing device 60 by vertical branches 70 connected together forming an upside-down U-shape, each of the branches 70 extending vertically starting from one respective lateral side of the fixed assembly 66. The lower end of said branches 70 each has a pin 68 snapping into an aperture 15 provided on each lateral side of the infusion unit 1, the respective aperture 15 being made in a protrusion 3 formed on the lateral upper edge of the belt 17. Said pin 68 may advantageously be in the form of a flexible tab.

The fixed assembly 66 is therefore inserted inside the area 2 in contact with the two lateral walls and positioned horizontally in a location defined between the front inner face of the belt and the ribs 73. The last possible relative motion of vertical translation thereof is limited downwards by the lateral reinforcements 16 which only allows a vertical upward motion for the dismounting thereof after action on the branches 70 to release the pins 68 from the apertures 15 made in the protrusions 23.

On the lower portion of the closing device 60, two portions 67 projecting downwards from the closing device 60 are provided between which the driving means of the device are inserted for the movement thereof. Said driving means are advantageously different from the driving means contained in the body 40 for the movement of the mobile half-chamber 42 but they may also be the same.

The fixed assembly 66 and the closing device 60 are thus in the form of two different components, a removable partial contact means being provided between them, said means guaranteeing a freedom of movement of the closing device 60 in relation to the fixed assembly 66 and being, for example, a means for guiding the closing device 60 on the fixed assembly 66.

The closing device 60 comprises downstream closing means 62 as well as upstream closing means 61. Said closing device is separate from each of the two half-chambers 32 and 42 forming the extraction chamber.

The downstream closing means 62 are arranged downstream of the extraction chamber. They are arranged so as to act as retractable stops for a dose inserted into the chamber. In a position not retracted the downstream closing means 62 provide the receiving of a dose inserted into the chamber while same is open, and prevent the ejection by gravity of said dose towards the downstream of the chamber.

In said position, the downstream closing means 62 also prohibit any intrusion into the chamber from the downstream of said latter. Thus, the user cannot, for example, insert his fingers into the chamber. In a retracted position, the downstream closing means 62 do not form a stop for a dose inserted into the chamber and therefore enable a dose to be evacuated when the chamber is opened.

The upstream closing means 61 are arranged so as to act as a retractable stop. They are arranged upstream of the extraction chamber. In a position not retracted, the upstream closing means 61 prevent a dose or any other element from entering into the extraction chamber from the upstream of said latter.

In said position not retracted, the upstream closing means 61 also provide the receiving and participate in the holding in position of a dose inserted into the machine. In retracted position, the upstream closing means 61 allow a dose to be inserted into the extraction chamber from the upstream of said latter.

The machine for making beverages includes a driving system arranged so as to pass the closing device 60 alternatively from a first position wherein the upstream closing means 61 prevent a dose from being entered into the chamber and the downstream closing means 62 ensure that no used dose remains present in the chamber, to a second position wherein the upstream closing means 61 allow a dose to be entered into the chamber and the downstream closing means 62 enable the dose to be received and held in the chamber.

The closing device 60 is arranged so that the position of the upstream closing means 61 determines the position of the downstream closing means 62 and that the position of the downstream closing means 62 determines the position of the upstream closing means 61. Thus, for a given position of the upstream closing means 61, the downstream closing means 62 only allow a single position and vice-versa. The closing device 60 therefore has a sequential operation.

The opening or closing passage of the upstream 61 or downstream closing means 62 of the dosing device 60 occurs advantageously by moving the closing device 60 between the two specific closing positions of the upstream 61 and downstream closing means 62. Said movement is advantageously a sliding on two guiding devices arranged so as to guide the closing device 60 in the alternative movement thereof between the first and second position. Each of the guiding devices acts as a slide 69 visible in FIG. 10 capable of providing the translational guidance of the dosing device 60 along a guide rail 72 visible on page 1 installed on the fixed assembly 66.

The closing device 60 also includes two arms 65 each extending from a respective slide 69 and in a direction substantially perpendicular to the axis of guidance. Advantageously, the upstream 61 and downstream dosing means 62 have the shape of a portion of a crown each of the ends of which joins one of the arms 65 and which is centered on an axis parallel to the axes of guidance.

At the highest end of each of the arms 65 joining said ends, are located blocking means 63 arranged so as to leave free the opening for entry of the dose when the closing device is arranged in the first position and to block said opening when the closing device is arranged in the second position.

Furthermore, the upstream 61 and downstream closing means 62 are arranged so as to have a mutual offset in the main direction of movement of the closing device 60. Thus, in the second position the upstream closing means 61 are arranged substantially rearwards of the fixed half-chamber 32. In the first position the upstream closing means 61 are arranged substantially forwards of the fixed half-chamber 32. In the first position the downstream closing means 62 are arranged substantially rearwards of the mobile half-chamber 42.

As can be seen, in particular in FIG. 1, in addition to the receiving means provided in the infusion unit 1 and therefore inside the belt 17, locking means 10 supported by the outer face of the lateral sides of the belt 17 may also be provided. First of all, the belt 17 has a housing 22 on the outer face of each of the lateral sides thereof for housing one of the respective locking means 10.

The longitudinal reinforcement ribs 18 of the belt 17 of the infusion unit 1 previously described can also be used for producing the movement of the locking means 10. Said ribs 18 therefore perform a dual function, the first being to reinforce the infusion unit 1 as previously mentioned and the second being to enable the movement of the locking means 10 associated to said unit 1.

The locking means 10 advantageously comprise complementary raised patterns 18a, causing no discontinuity in the outer geometry of the belt 17 in order to enable the overall taking up of the forces generated during the infusion. Said complementary raised patterns 18a are rotated towards the inside of the housing 22 and face the guide grooves provided inside said housing 22 and visible in FIG. 5 in order to provide the translational guidance of said means 10. Said complementary raised patterns 18a may, for example, be in the form of longitudinal ribs adapted to the ribs 18 of the belt 17, said complementary ribs 18a sliding between the guide grooves of the housing 22 of the belt 17.

The locking means 10 advantageously have a front portion 11 forming a bolt, extending from the belt 17 in locking position as well as a portion 11a laterally projecting from the locking means 10, said portion 11a may also be used as a bolt being received in a suitable strike supported by the component part of the machine for preparing beverages to which the unit 1 may be rigidly connected, a component part which may be a container 3. Moreover, said portion 11a and the transverse post 21 insert between them the lower end 5a of the arm of the handle 5 for the holding thereof and the engagement thereof with the locking means 10, as is visible in FIG. 13.

In FIGS. 1 and 13, the locking means 10 supported by the infusion unit 1 are visible in removal position for FIG. 13 or at a distance from the infusion unit 1 for FIG. 1. The locking means 10 supported by the infusion unit 1 are advantageously in the form of at least one bolt, preferentially a bolt supported by each lateral side of the belt 17 of the unit 1. Said locking means 10 forming bolts are respectively received in the housing 22 made in the outer face of a lateral side of the belt 17 such that said means 10 may thus be housed in the belt 17 and do not laterally protrude from the belt 17.

The locking means 10 forming bolts are configured to engage with the complementary locking means supported by the container 3, said complementary locking means forming at least one strike. For example, said complementary locking means forming at least one strike may advantageously be in the form of at least one housing receiving the portion forming a bolt of the locking means 10. The contrary is also possible with locking means forming strikes on the infusion unit and locking means forming bolts on the container.

Advantageously, the locking means 10 are made from the same engineered plastic material as that of the belt 17 and in particular the ribs 18 thereof. It is also possible that the two locking means 10, each on a lateral side of the belt 17, may form a single and the same totally symmetrical component.

During the infusion phases, the locking means 10 are rigidly connected to the belt 17 and provide the holding thereof in relation to the container 3 of the machine without increasing the space requirement of the infusion unit 1, the shape of which remains globally parallelepiped. The translational mobility of the locking means 10 enables them to be retractable during the extraction of the infusion unit 1, said removal being carried out by the actuation means 5.

It is possible to design a form of movement of the locking means 10 supported by the belt 17 of the infusion unit 1 other than a sliding movement on the exterior of one lateral side of said unit 1 as shown in the figures.

The locking means 10 are activated or deactivated by the actuation means. Said actuation means include a control element in the form of a handle 5, said control element being used to release the locking means 10 by means of action thereon in locked position thereof and thus disconnecting the infusion unit 1 from the container 3 thereof forming the support element of said unit 1. The actuation means 5 are advantageously configured to be activated manually by the operator, preferably with a single hand.

Advantageously, the infusion unit 1 may be rendered removable from the container 3 in order to provide the cleaning thereof, the maintenance thereof or the end-of-life recycling of the machine containing said unit. An infusion unit 1 in place in the container 3 is shown in FIG. 14.

In the machine according to the present invention, the container 3 may be rigidly connected to the machine for making beverages by means of the extraction of a product to be infused and has a hollow inner space 4 that receives the main portion of the infusion unit 1 by surrounding said unit around the entire outer perimeter thereof.

The actuation means 5, visible at least partially in FIGS. 1, 13 and 14 supported by the infusion unit 1 control the locking means 10 arranged on the infusion unit 1. In a position for deactivating the actuation means 5, the locking means 10 prevent the unit 1 from being disconnected from the container 3 and in a position for activating the actuation means 5, the locking means 10 allow the unit 1 to be disconnected from the container 3.

The actuation means 5 can also be associated to a gripping member 6 including towards the upper portion thereof a gripping surface 7. The control element, in the form of a handle 5 in FIGS. 1 and 13, may thus be advantageously associated with the gripping member 6 in order to perform the removal of the infusion unit 1 from the interior of the container 3 when the locking means 10 are in unlocked position.

It should be noted that the actuation means supported by the infusion unit do not necessarily include a handle as a control element although this is the case in the figures of the present invention. The actuation means may, for example, thus include a control element, for example, a button intended to be pulled, pressed or rotated, said control element being hinged onto the infusion unit and configured to participate, at least partially, in the gripping of the unit in view of the separation thereof from the container.

As can be seen in particular in FIGS. 1 and 13, the handle 5 is advantageously in the form of an upside-down U-shape, the free ends 5*a* of the U-shape pointing towards the container 3, said container only being visible in FIG. 14, this in mounted position of the handle 5 on the infusion unit 1. The handle 5 thus extends perpendicularly to the plane formed by the bottom of the infusion unit 1 or of the container 3. The handle 5 is vertically mobile, i.e. perpendicularly to the plane formed by the bottom of the infusion unit 1 or by the same of the container 3 thereof. The base of the upside-down U-shape is used as a head 5*b* forming a gripping surface for the handle 5 and it is on the head 5*b* that the operator presses or pulls to cause the handle 5 to move.

The free lower end 5*a* of the handle 5 is received in the housing 22 made in the belt 17, said housing 22 also being used for receiving the locking means 10. Thus, said locking means 10 and the handle 5 housed together in the recess 22 provided in the belt 17 do not project laterally from said belt 17. The belt 17 also includes a transverse post 21, extending above the housing 22 and therefore the substantially median portion of which has a lug 21*a* oriented towards the front of the infusion unit 1 in order to laterally hold the handle 5 in relation to the infusion unit 1.

In front of each free lower end 5*a* of the handle 5, said handle has an inclined portion the sides of which, instead of being substantially vertical like the sides of the rest of the handle 5, extend with an inclination in relation to the vertical. One of the sides of said inclined portion forms a surface engaging with a complementary element of the locking means 10 to push them into activation or deactivation position.

The gripping member 6 also has a U-shape with the ends of the U-shape pointing towards the infusion unit 1 and being rigidly connected to the peripheral belt 17 of said unit 1. Said gripping member 6 is thus rigidly connected to the unit 1 and is used to remove the unit 1 out of the container when an operator pulls the gripping member 6 vertically upwards or upon the installation thereof in the container 3.

Advantageously, the gripping member 6 and the handle 5 are adjacent to one another, the base 5*b* of the U-shape for the handle or a portion 7 of the base of the U-shape for the gripping member 6 forming the respective upper portion thereof located approximately at the same height, at least during the removal of the infusion unit 1 from the container 3 thereof. Said two elements 5 and 6 are thus shaped such that an operator can grasp simultaneously and with a single hand the handle 5 and the gripping member 6.

Advantageously, the activation of the actuation means 5 corresponds to an action by the operator in order to perform the unlocking of the locking means 10 whereas the deactivation of the actuation means corresponds to a position of the actuation means 5 for which no action is exerted thereon in view of unlocking the locking means 10. The deactivation of the actuation means 5 should not be taken in the strict sense, given that said deactivation stops automatically as soon as the operator performs a movement of the control element of the actuation means in view of unlocking the locking means 10.

As is visible in FIGS. 1 and 13, the handle 5 representing the control element of the actuation means includes a safety notch 8. Said safety notch 8 has the advantage of enabling a mounting of the handle 5 without tools and facilitating the in-plant assembly of the infusion unit 1 and the maintenance thereof, said safety notch 8 being able to engage with the locking means 10.

Advantageously, it is the lowering of the handle 5 which deactivates the locking means 10 when a vertical downward pressure is performed by the operator on the head 5*b* of the handle 5. The locking means 10 are therefore pushed forwards of the infusion unit 1 in a position for unlocking and therefore releasing the infusion unit from the container receiving said unit.

A tension exerted on the handle 5 and/or gripping member 6 is therefore sufficient for separating the infusion unit 1 from the container thereof, the safety notch 8 of the handle 5 no longer abutting against a portion of the locking means 10.

As is visible in FIG. 1, return means are configured to bring the actuation means 5 back in top position when they are not activated, i.e. when no downward pressure is exerted thereon. Thus, according to one embodiment of the invention, two vertical springs 20 are provided which push the handle 5 in top position as shown in FIG. 1, said two vertical springs 20 enabling the handle 5 to take the bottom position only when a pressure from top to bottom is exerted thereon by an operator. As is visible in FIG. 2, each of said vertical springs 20 is held in a chute 12 extending substantially vertically along one of the posts of the gripping member 6.

Thus, the top position of the handle 5 corresponds to a deactivation of the actuation means that said position constitutes, the locking means 10 therefore being returned to locking position by the associated return means 20a, said return means 20a advantageously exerting the action thereof horizontally and being visible in FIGS. 1 and 13.

Thus, the actuation means 5 according to the present invention may also fulfil, advantageously with the additional gripping means 6, the function of means for inserting and/or removing the infusion unit 1 into or out of the container 3 thereof for a dismounting of the assembly.

Figure 15:
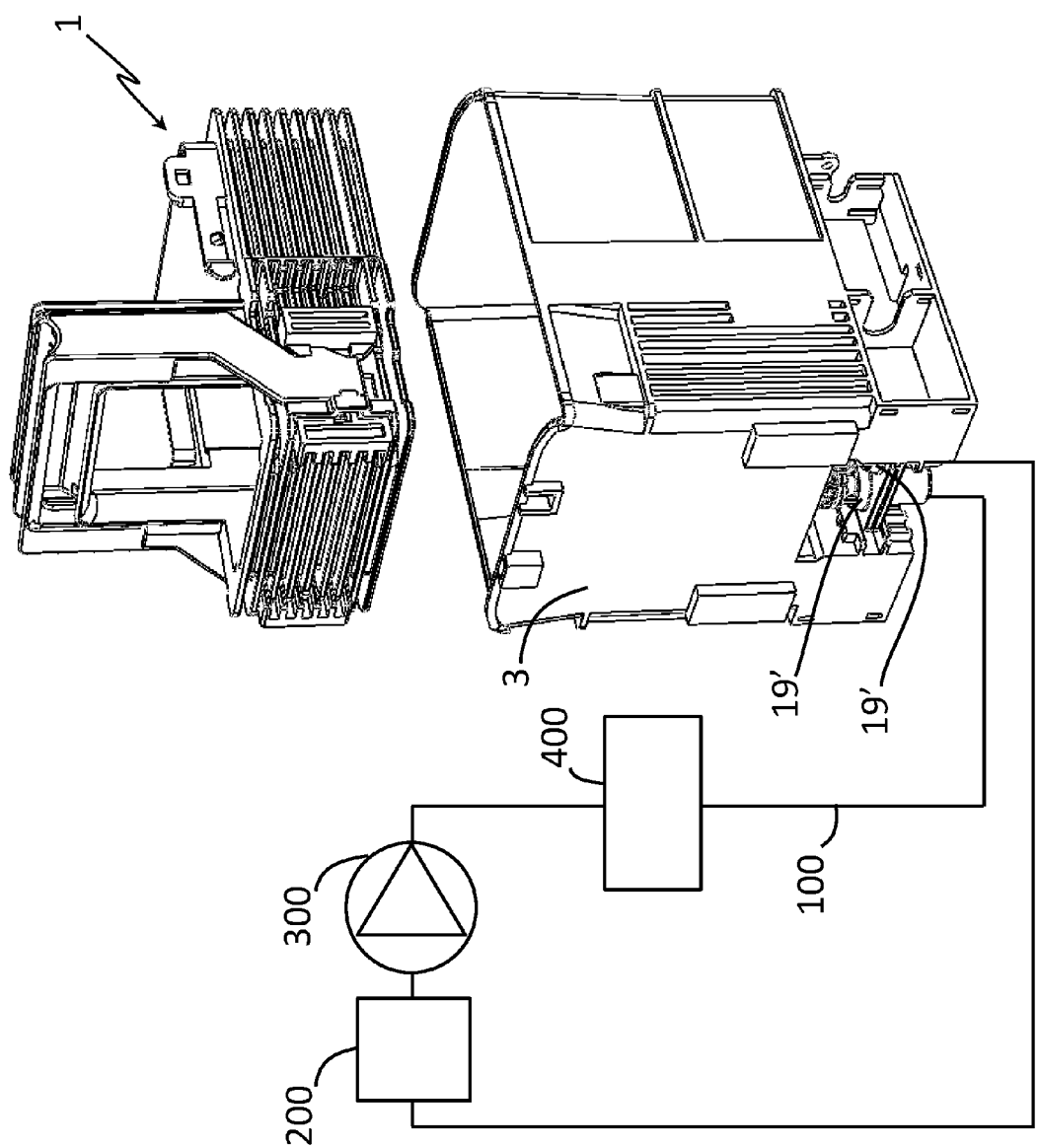
FIG. 15 is an exploded, isometric view from above of the container and the infusion unit with a schematic depicting a hot water circuit.
Figure 16:
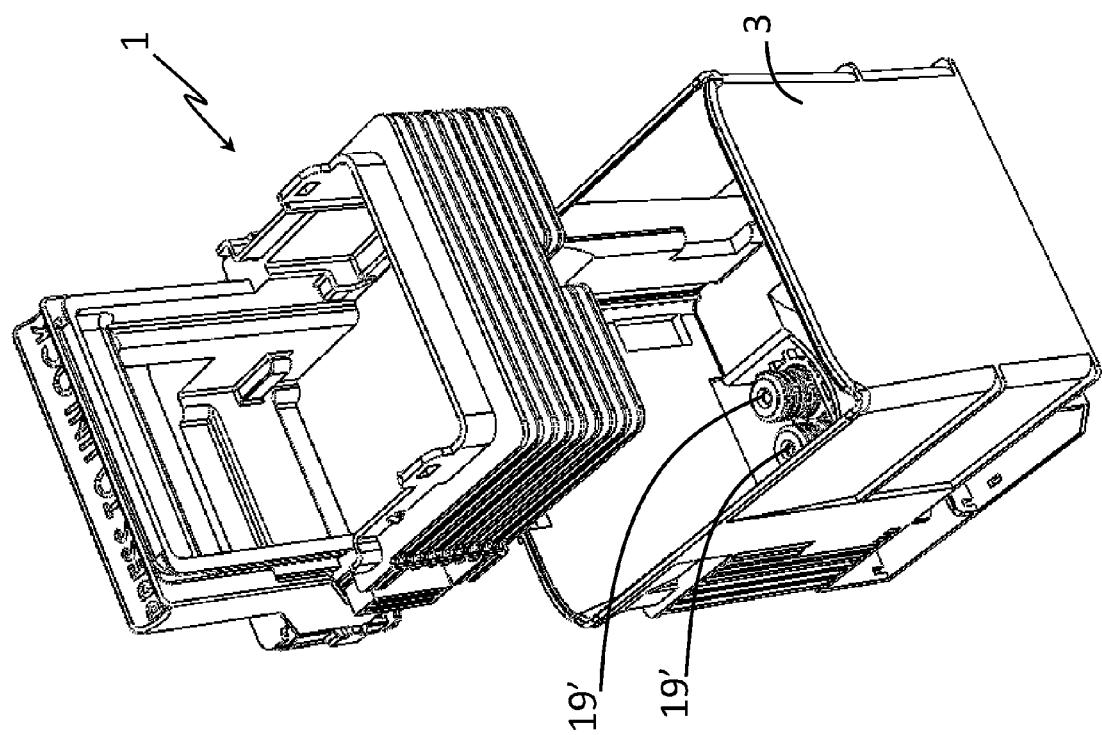
FIG. 16 is an exploded, isometric view from above of the container and the infusion unit of FIG. 15 showing an interior of the container.

The removability of the infusion unit 1 further requires a disconnection of the hydraulic inlets necessary for operating the driving means, for example, a cylinder. The disconnection of the hydraulic inlets is performed by means of vertical hydraulic connectors 19' installed under the infusion unit 1, said connectors being visible in the FIGS. 15 and 16 because arranged in the inner space 4 of the container 3 passing through the bottom thereof.

Advantageously, there are two of said hydraulic connectors 19', the infusion unit 1 including two complementary connectors 19 in order to provide the hydraulic supply of the unit 1, visible in FIGS. 1, 6, 7 and 9. Advantageously, the locking means 10 and the complementary locking means thereof supported by the container 3 are distributed on either side of the connectors inside the container 3 thus preventing the infusion unit from rotating when exposed to the pressure from the fluid supplying the unit 1.

Said complementary locking means are advantageously positioned on the walls of the container 3 the farthest from the axis of symmetry separating the connectors from the container 3. Said positioning increases the lever arm in relation to the axis of rotation around which unit 1 would have a tendency to rotate when exposed to the pressure. Thus, said measure enables a limited space requirement and weight to be maintained whilst offering good robustness.

It should be noted that with the exception of the springs 20 and 20a, the entire infusion unit and the inserted elements thereof as well as the locking means may be made from injected plastic material, which reduces the manufacturing and assembly times and facilitates the end-of-life dismantling of the machine, whilst having significant resistance to the forces transmitted to the infusion unit by the inserted elements inside said unit.

The present invention thus offers a robust and inexpensive solution for obtaining an infusion unit with a high resistance to the forces exerted on at least one element inserted in the interior thereof, such a unit being able to receive the elements by simple and effective receiving means not requiring a long mounting of the elements during the insertion thereof, such a unit being, on the other hand, easy to manufacture and dismantle at the end of life.

A method according to the present invention for assembling at least one element 32, 40, 42, 60, 66 to be inserted into an infusion unit 1 includes the step for mounting the element 32, 40, 42, 60, 66 inside a reinforcement belt 17 flanking the inner space of the unit 1, such that the force exerted on said element 32, 40, 42, 60, 66 is transmitted to the belt 17 therefore taking up the forces exerted on the element 32, 40, 42, 60, 66.

The method for assembling at least one element 32, 40, 42, 60, 66 to be inserted into an infusion unit 1 may also include the following steps:

the driving means of the mobile half-chamber 42 are inserted into the inner space 2 of the infusion unit 1, where applicable with the mobile half-chamber 42 when said half-chamber is grouped with the driving means, this in a position in the inner space other than the final position thereof, the driving means are slid inside said unit 1 in the final position thereof resting against a face of the unit 1 and the driving means are rigidly connected to the unit 1, the mobile half-chamber 42 is inserted into the inner space 2 of the infusion unit 1, when said mobile half-chamber has not already been inserted with the driving means, the fixed half-chamber 32, resting on the face opposite the support face of the driving means, is inserted into the inner space 2 of the infusion unit 1, the rigid connection with said face being carried out via the rear of the fixed chamber 32.

Advantageously, the following additional steps may be carried out:

in the inner gap of the unit 1 remaining between the fixed chamber 32, on one hand, and the mobile chamber, on the other hand, is inserted a fixed assembly 66 supporting, with sliding freedom in relation to said fixed assembly 66, a closing device 60 upstream and downstream of the fixed 32 and mobile half-chambers 42, the lateral portions of said fixed assembly 66 being rigidly connected to the portions facing the unit 1, the locking means 10 of the unit 1 are inserted in relation to a component part 3 of the machine receiving said unit on an outer portion of a lateral side of the unit 1, this by sliding of the locking means lengthwise of the side, the actuation means 5 are stacked on the locking means 10 such that a vertical movement of the actuation means 5 results in horizontal sliding of the locking means 10.

The invention is not limited to the embodiments described but applies to any embodiment complying with the spirit thereof.

REFERENCES 1. infusion unit
2. inner space
3. container
4. inner space
5. handle
5a. end portion
5b. head
6. gripping member
7. gripping surface
8. safety notch
9. stud
10. locking means
11. front end
11a. portion projecting
12. chute
13. sliding rail
14. lug
15. aperture
16. sliding rail
17. belt
18. ribs
18a. complementary raised patterns
19. connector
20. vertical return spring
20a. horizontal return spring
21. transverse post
21a. lug 22. housing
23. protrusion
32. fixed half-chamber
33. support plate
34. recess
35. evacuation pipe
40. body
41. projecting portions
42. mobile half-chamber
43. ring-shaped component
60. opening and closing device
61. upstream closing means
62. downstream closing means
63. blocking means
65. arm
66. fixed assembly
67. portions projecting
68. pin
69. slide
70. branch
71. hopper
72. guide rail
73. rib

What is claimed is:

1. A machine for making beverages by extraction of a product to be infused in the form of a dose, including an infusion unit forming a hollow inner space that receives inserted elements including at least one mobile half-chamber, another half-chamber opposite, said two half-chambers in a position applied one against the other forming an extraction chamber, as well as a driving device for the mobile half-chamber between a position applied against the other half-chamber and a position at a distance from said other half-chamber;
    wherein the infusion unit comprises a reinforcement belt defining the hollow inner space of the infusion unit, said reinforcement belt configured for taking up forces generated while infusing on at least one of the inserted elements, the reinforcement belt including at least a receiving member for each of said inserted elements, the reinforcement belt forming a unitary belt forming a periphery of the infusion unit, the reinforcement belt further defining two opposite openings configured so that at least said mobile half-chamber, said other half-chamber, and said driving device are inserted through said openings for their attachment to the reinforcement belt with the at least one associated receiving member;
    a hydraulic circuit comprising a pump, the hydraulic circuit being intended to be fluidly connected to the infusion unit, and
    a container for receiving the unit onto the machine,
    an actuation device for the locking and/or insertion of the unit into part of the machine or for separation of the unit from the part of the machine,
    wherein the machine is arranged such that a rigid connection of the unit to the container causes the fluidic connection of the unit to the hydraulic circuit,
    wherein the container includes at least one vertical hydraulic connector and the unit includes at least one complementary fluidic connector, the machine being configured such that the insertion of the unit into the container results in engagement of the at least one vertical hydraulic connector with the at least one complementary fluidic connector, said engagement providing the fluidic connection between the hydraulic circuit and the infusion unit, and
    wherein according to the function of the associated inserted element thereof, each receiving member is removable from the unit or each receiving member is a support member of said at least one of the inserted elements.

2. The machine according to claim 1, wherein the device for taking up the forces is at least one reinforcement rib arranged on at least one of the faces of the belt on the outer perimeter thereof, said rib extending lengthwise of said face of the belt.

3. The machine according to claim 2, wherein a plurality of ribs is provided for the face of the belt, said ribs extending in parallel.

4. The machine according to claim 1, wherein said other half-chamber is fixed in relation to the belt.

5. The machine according to claim 1, for which the driving device is grouped in a body having on each of the lateral portions thereof two projecting portions forming a gap between them intended to respectively receive a sliding rail supported by the inner space of the infusion unit defined by the belt, said rails forming a first receiving member of the at least one receiving member for the driving device.

6. The machine according to claim 5, for which the face of the body opposite that facing the other half-chamber and adjacent to the two lateral faces is resting against an inner face of the belt.

7. The machine according to claim 5, for which the front portion of the body on each of the lateral sides thereof is supported by a lug supported by the inner space defined by the belt, said lugs forming a second receiving member of the at least one receiving member for said driving device.

8. The machine according to claim 7, wherein the body includes a ring-shaped component surrounding said body at least partially and snapping onto each of said lugs.

9. The machine according to claim 8, wherein the snapping-on of the ring-shaped component pre-compresses a return device for the driving device enabling the driving device to be returned from the applied position of the mobile half-chamber against the other half-chamber.

10. The machine according to claim 9, wherein the driving device includes a cylinder.

11. The machine according to claim 5, for which the mobile half-chamber and the driving device thereof is grouped in the body, the mobile half-chamber maintaining a freedom of movement lengthwise of said body.

12. The machine according to claim 1, wherein the other half-chamber comprises on the rear face thereof, opposite that facing the mobile half-chamber, a support plate, said plate comprising recesses engaging with studs provided on an inner front face of the reinforcement belt, said studs forming the at least one receiving member of the belt for the fixed half-chamber.

13. The machine according to claim 1, wherein the inserted elements in the inner space of the unit include a closing device upstream and downstream of the half-chambers, said closing device being supported by a fixed assembly intended to be attached to the belt, said fixed assembly comprising a device for guiding the dose to be infused, a pin being arranged on each lateral portion of the fixed assembly, wherein each pin, when in a mounted position of said fixed assembly in the infusion unit, faces a protrusion of the lateral portion of the belt having at least a respective aperture for the insertion thereof, each of said respective apertures forming the at least one receiving member for the attachment of the fixed assembly onto the belt.

14. The machine according to claim 13, for which the closing device is arranged to be positioned resting on each of the lateral sides thereof, on a lateral reinforcement provided on each inner lateral face of the belt, said lateral reinforcements being configured to locally increase the transversal section of the belt.

15. The machine according to claim 1, wherein the unit comprises a locking device of the unit for the attachment thereof to the container of the machine.

16. The machine according to claim 1, wherein said engagement of the at least one fluidic connector with the at least one complementary fluidic connector is obtained by a relative translational motion between the unit and the hydraulic circuit.

17. The machine according to claim 1, wherein the container of the unit is configured to enable removable disconnection of the unit, and the machine is arranged such that the disconnection of the unit from the container eliminates the fluidic connection between the unit and the hydraulic circuit.

18. The machine according to claim 1, wherein the driving device of the infusion unit includes a cylinder and wherein the at least one complementary fluidic connector is carried by the cylinder.

19. A method for assembling the at least one of the inserted elements comprising the steps of:
providing the machine according to claim 1,
mounting the at least one of the inserted elements inside the reinforcement belt flanking the inner space of the unit,
inserting through said openings at least said mobile half-chamber, said other half-chamber and said driving device,
attaching to the reinforcement belt with the receiving members, such that the force exerted on said at least one of the inserted elements is transmitted to the belt, thereby resulting in the belt taking up the forces exerted on the at least one of the inserted elements.

20. The method according to claim 19, wherein the following steps are included:
inserting the driving device of the mobile half-chamber into the inner space of the infusion unit, where the driving device is applied against the mobile half-chamber when said half-chamber is grouped with the driving device, this in a position in the inner space other than a final position thereof,
sliding the driving device inside said unit in the final position thereof resting against a support face of the unit and the driving device is rigidly connected to the unit,
inserting the mobile half-chamber into the inner space of the infusion unit when said mobile half-chamber has not already been inserted with the driving device, and
inserting the other half-chamber, resting on a face opposite said support face of the driving device, into the inner space of the infusion unit, the rigid connection with said face being carried out via the rear of said other half-chamber.

21. The method according to claim 20, wherein the following steps are included:
inserting a fixed assembly into the inner gap of the unit remaining between said other half-chamber and into the mobile chamber, the fixed assembly supporting, with sliding freedom in relation to said fixed assembly, a closing device upstream and downstream of the fixed and mobile half-chambers, the lateral portions of said fixed assembly being rigidly connected to the portions facing the unit,
inserting a locking device of the unit for attachment thereof to the container of the machine wherein the machine receives said unit on an outer portion of a lateral side of the unit by sliding of the locking device lengthwise of the side,
stacking the actuation device on the locking device such that a vertical movement of the actuation device results in a horizontal sliding of the locking device.

* * * * *